US010275411B2

(12) United States Patent
Kura et al.

(10) Patent No.: US 10,275,411 B2
(45) Date of Patent: Apr. 30, 2019

(54) MANAGEMENT SYSTEM FOR COMPUTER SYSTEM

(71) Applicant: HITACHI, LTD., Tokyo (JP)

(72) Inventors: Toshihiro Kura, Tokyo (JP); Daisuke Nogami, Tokyo (JP); Tsutomu Fujii, Kanagawa (JP); Yasufumi Uchiyama, Tokyo (JP); Masahide Ban, Tokyo (JP); Tomoto Washio, Tokyo (JP); Masashi Nakanishi, Tokyo (JP); Chizuko Sasanabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 252 days.

(21) Appl. No.: 15/120,917

(22) PCT Filed: Sep. 29, 2014

(86) PCT No.: PCT/IB2014/002765
§ 371 (c)(1),
(2) Date: Aug. 23, 2016

(87) PCT Pub. No.: WO2016/051226
PCT Pub. Date: Apr. 7, 2016

(65) Prior Publication Data
US 2016/0371351 A1 Dec. 22, 2016

(51) Int. Cl.
*G06F 3/048* (2013.01)
*G06F 3/0482* (2013.01)
(Continued)

(52) U.S. Cl.
CPC ............. *G06F 16/26* (2019.01); *G06F 3/048* (2013.01); *G06F 3/0482* (2013.01);
(Continued)

(58) Field of Classification Search
CPC ......... G06F 17/30572; G06F 17/30554; G06F 17/3053; G06F 3/0482
See application file for complete search history.

(56) References Cited

U.S. PATENT DOCUMENTS 6,170,010 B1   1/2001  Hirata et al.
7,890,869 B1   2/2011  Mayer et al.
(Continued)

FOREIGN PATENT DOCUMENTS

JP   09-244838 A   9/1997
JP   10-232843 A   9/1998
(Continued)

*Primary Examiner* — Shourjo Dasgupta
(74) *Attorney, Agent, or Firm* — Volpe and Koenig, P.C.

(57) ABSTRACT

A management system (A) assigns a priority to each of a plurality of elements matching a predetermined condition based on management information including information representing a relation among elements and information representing a metric of each of the elements, (B) displays a visual representing a visual priority given to each of element based on one or more priorities given in (A), (C) when receiving selection of the elements from the visual displayed in (B), selects a higher or lower level layer of a layer containing a selected element, and selects one or more elements related to the selected element and contained in the selected layer, based on a level relation among a plurality of layers and a correlation between element types and layers, and (D) performs (A) with the one or more elements selected in (C) treated as the one or more elements matching the predetermined condition.

14 Claims, 27 Drawing Sheets

(51) Int. Cl.
  *G06F 11/07* (2006.01)
  *G06F 16/26* (2019.01)
  *G06F 16/248* (2019.01)
  *G06F 16/2457* (2019.01)
  *G06F 11/32* (2006.01)
  *G06F 11/34* (2006.01)

(52) U.S. Cl.
  CPC .......... *G06F 11/324* (2013.01); *G06F 16/248* (2019.01); *G06F 16/24578* (2019.01); *G06F 11/3409* (2013.01); *G06F 2201/81* (2013.01)

(56) References Cited

U.S. PATENT DOCUMENTS

| | | | |
|---|---|---|---|
| 2002/0055996 A1 | 5/2002 | Sugauchi et al. | |
| 2004/0167672 A1* | 8/2004 | McIlhany | G05B 15/02 |
| | | | 700/275 |
| 2009/0249213 A1 | 10/2009 | Murase et al. | |
| 2010/0042644 A1 | 2/2010 | Judy et al. | |
| 2010/0306259 A1* | 12/2010 | Svinth | G06F 3/0482 |
| | | | 707/776 |
| 2011/0144777 A1* | 6/2011 | Firkins | G05B 23/027 |
| | | | 700/80 |
| 2011/0145746 A1* | 6/2011 | Malnati | G06F 11/327 |
| | | | 715/771 |
| 2011/0161085 A1* | 6/2011 | Boda | G06Q 30/02 |
| | | | 704/260 |
| 2011/0238660 A1* | 9/2011 | Riggs | G06F 17/30516 |
| | | | 707/726 |
| 2011/0252327 A1 | 10/2011 | Awasthi et al. | |
| 2012/0023429 A1 | 1/2012 | Medhi | |
| 2013/0060385 A1* | 3/2013 | Leen | F24F 11/0009 |
| | | | 700/276 |
| 2015/0378521 A1* | 12/2015 | Wang | G06F 9/451 |
| | | | 715/841 |

FOREIGN PATENT DOCUMENTS

| | | |
|---|---|---|
| JP | 11-143742 A | 5/1999 |
| JP | 2000-066976 A | 3/2000 |

* cited by examiner

FIG. 1
| ID | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Response time (ms) | 14 | 1 | 8 | 12 | 13 | 11 | 20 | 30 | 40 | 70 | 100 | 10 | 6 | 4 | 9 |
| SV | 2 | 1 | 1 | 2 | 2 | 2 | 2 | 2 | 2 | 3 | 3 | 1 | 1 | 1 | 1 |
| IOPS | 45 | 110 | 90 | 150 | 140 | 130 | 80 | 100 | 140 | 80 | 10 | 130 | 120 | 120 | 140 |
| SV | 3 | 1 | 2 | 1 | 1 | 1 | 2 | 1 | 1 | 2 | 3 | 1 | 1 | 1 | 1 |
FIG. 2
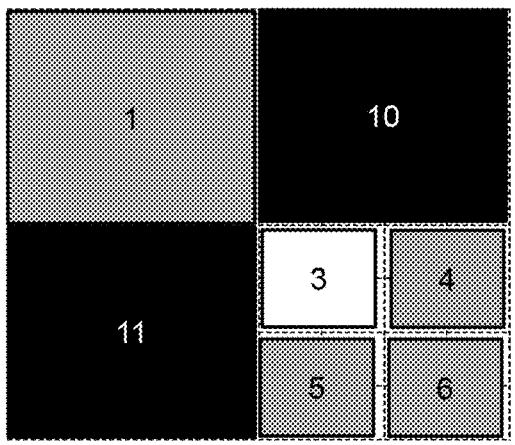
FIG. 3
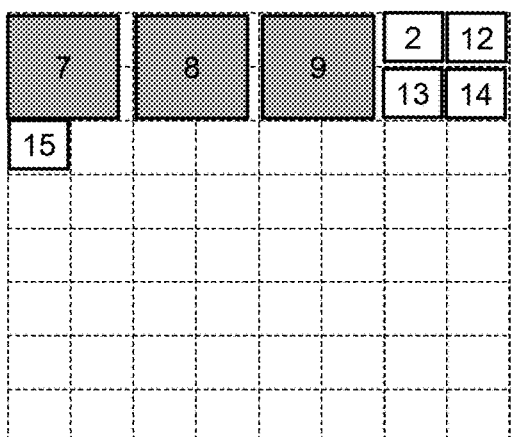

FIG. 18

Element table
1800

| Element ID | Element name | Element type | Parent element ID | Child element ID | Measurement ID | Worst priority |
|---|---|---|---|---|---|---|
| Elem1 | ALL TENANT | ALLTENA | N/A | Elem2, Elem3 | Perf1 | N/A |
| Elem4 | EMEA/Manufacturing | REGION/DEPT | Elem1 | Elem8, Elem9 | Perf4 | 1 |
| Elem5 | EMEA/IT | REGION/DEPT | Elem1 | Elem8, Elem11, Elem12 | Perf5 | 1 |
| Elem6 | North America / Marketing | REGION/DEPT | Elem1 | Elem8, Elem10 | Perf6 | 3 |
| Elem7 | North America / IT | REGION/DEPT | Elem1 | Elem8, Elem11, Elem12 | Perf7 | 2 |
| Elem8 | Mail01 | APP.MAIL | Elem4, ..., Elem7 | Elem13, Elem17 | Perf8 | 1 |
| Elem9 | Archive01 | APP.ARCHIVE | Elem4 | Elem14, Elem16 | Perf9 | 1 |
| Elem10 | Archive02 | APP.ARCHIVE | Elem6 | Elem14, Elem16 | Perf10 | 3 |
| Elem11 | DB01 | APP.DBMS | Elem5, Elem7 | Elem15, Elem17 | Perf11 | 1 |
| Elem12 | VM01 | APP.VM | Elem5, Elem7 | Elem15, Elem17 | Perf12 | 2 |
| Elem13 | Server1 | APPARATUS.SVR | Elem8 | Elem18, Elem19 | Perf13 | 1 |
| Elem14 | Server2 | APPARATUS.SVR | Elem9, Elem10 | Elem... | Perf14 | 1 |
| Elem15 | Server3 | APPARATUS.SVR | Elem11, Elem12 | Elem20...Elem22 | Perf15 | 2 |
| Elem16 | Storage1 | APPARATUS.STG | Elem8, ..., Elem12 | Elem... | Perf16 | 3 |
| Elem17 | Storage2 | APPARATUS.STG | Elem8, ..., Elem12 | Elem... | Perf17 | 2 |
| Elem18 | CPU1 | COMPONENT.SVR.CPU | Elem13 | N/A | Perf18 | 1 |
| Elem19 | Memory1 | COMPONENT.SVR.MEM | Elem13 | N/A | Perf19 | 1 |
| Elem20 | Port1 | COMPONENT.STG.PORT | Elem16 | N/A | Perf20 | 3 |
| Elem21 | Cache1 | COMPONENT.STG.CACHE | Elem16 | N/A | Perf21 | 1 |
| Elem22 | Pool1 | COMPONENT.STG.POOL | Elem16 | N/A | Perf22 | 2 |
| ... | ... | ... | ... | ... | ... | ... |

FIG. 19

Element measurement table
1900

| Measurement ID | Measurement time | Response Time / SV | IOPS / SV | Data transfer rate / SV | Number of alert events/ SV | ... |
|---|---|---|---|---|---|---|
| Perf6 | 20140311185000 | 42ms / 2 | 21 / 1 | 0.17MB/s / 1 | 2 / 1 | ... |
| Perf6 | 20140311185100 | 32ms / 2 | 20 / 1 | 0.15MB/s / 1 | 3 / 1 | ... |
| Perf6 | 20140311185200 | 75ms / 3 | 28 / 1 | 5.70MB/s / 1 | 8 / 1 | ... |
| Perf6 | 20140311185300 | 4ms / 1 | 26 / 1 | 0.14MB/s / 1 | 1 / 1 | ... |
| Perf6 | 20140311185400 | 58ms / 3 | 30 / 1 | 4.82MB/s / 1 | 6 / 1 | ... |
| Perf6 | 20140311185500 | 4ms / 1 | 21 / 1 | 0.14MB/s / 1 | 1 / 1 | ... |
| Perf6 | 20140311185600 | 4ms / 1 | 20 / 1 | 0.12MB/s / 1 | 0 / 1 | ... |
| Perf6 | 20140311185700 | 4ms / 1 | 21 / 1 | 0.11MB/s / 1 | 0 / 1 | ... |
| Perf6 | 20140311185800 | 12ms / 2 | 22 / 1 | 0.54MB/s / 1 | 1 / 1 | ... |
| Perf6 | 20140311185900 | 12ms / 2 | 21 / 1 | 1.03MB/s / 1 | 2 / 1 | ... |
| Perf6 | 20140311190000 | 12ms / 2 | 21 / 1 | 0.36MB/s / 1 | 1 / 1 | ... |
| Perf6 | 20140311190100 | 5ms / 1 | 20 / 1 | 0.14MB/s / 1 | 0 / 1 | ... |
| Perf6 | 20140311190200 | 12ms / 1 | 22 / 1 | 0.24MB/s / 1 | 1 / 1 | ... |
| Perf7 | 20140311185000 | 4ms / 1 | 30 / 1 | 0.24MB/s / 1 | 0 / 1 | ... |
| Perf7 | 20140311185100 | 4ms / 1 | 21 / 1 | 0.12MB/s / 1 | 0 / 1 | ... |
| Perf7 | 20140311185200 | 4ms / 1 | 20 / 1 | 0.11MB/s / 1 | 11 / 2 | ... |
| Perf7 | 20140311185300 | 4ms / 1 | 21 / 1 | 0.54MB/s / 1 | 0 / 1 | ... |
| Perf7 | 20140311185400 | 13ms / 2 | 22 / 1 | 1.02MB/s / 1 | 1 / 1 | ... |
| Perf7 | 20140311185500 | 15ms / 2 | 22 / 1 | 0.39MB/s / 1 | 1 / 1 | ... |
| Perf7 | 20140311185600 | 14ms / 2 | 21 / 1 | 0.14MB/s / 1 | 2 / 1 | ... |
| Perf7 | 20140311185700 | 5ms / 2 | 19 / 1 | 0.12MB/s / 1 | 0 / 1 | ... |
| ... | ... | ... | ... | ... | ... | ... |

FIG. 20

Screen history table
2000

| Manipu lation ID | User manipulation | Parent visual display condition | Main visual display condition | Child visual display condition | Parent visual bit map ID | Child visual bit map ID |
|---|---|---|---|---|---|---|
| 1 | Display initial screen | N/A | View1 | View0 | N/A | bmp0 |
| 2 | Move to lower-level layer | View1 | View2 | View0 | bmp1 | bmp0 |
| 3 | Move to lower-level layer | View2 | View3 | View0 | bmp2 | bmp0 |
| 4 | Change display condition | View2 | View4 | View0 | bmp2 | bmp0 |
| 5 | Move to lower-level layer | View4 | View5 | View0 | bmp4 | bmp0 |
| 6 | Move to higher-level layer | View0 | View6 | View5 | bmp0 | bmp5 |
| ⋮ | ⋮ | ⋮ | ⋮ | ⋮ | ⋮ | ⋮ |

FIG. 21

Display condition table
2100

| Display condition ID | Layer ID | Selected element ID | Period Start | Period End | Threshold1 | Threshold2 | Default | Metric type | ... |
|---|---|---|---|---|---|---|---|---|---|
| View0 | N/A | N/A | N/A | N/A | N/A | N/A | N/A | N/A | ... |
| View1 | REGION/DEPT | N/A | 20140311000000 | 20140312000000 | 80 | 90 | Y | IOPS | ... |
| View2 | APP | Elem6 | 20140311000000 | 20140312000000 | 85 | 90 | N | IOPS | ... |
| View3 | APPARATUS | Elem10 | 20140311000000 | 20140312000000 | 85 | 90 | N | IOPS | ... |
| View4 | APPARATUS | Elem10 | 20140311090000 | 20140312170000 | 85 | 90 | N | IOPS | ... |
| View5 | COMPONENT | Elem16 | 20140311090000 | 20140312170000 | 85 | 90 | N | IOPS | ... |
| View6 | APP | Elem16 | 20140311090000 | 20140312170000 | 85 | 90 | N | IOPS | ... |
| ... | | | | | | | | ... | |

FIG. 22

Highlighting element table
2200

| Highlighting element ID | Highlighting element ID |
|---|---|
| Elem16 | Elem1 |
| Elem16 | Elem4 |
| Elem16 | Elem5 |
| Elem16 | Elem6 |
| Elem16 | Elem9 |
| Elem16 | Elem10 |
| Elem16 | Elem20 |
| Elem16 | Elem21 |
| Elem16 | Elem22 |
| ... | ... |

FIG. 23

Marking table
2300

| Element ID | Element type | Marking time |
|---|---|---|
| Elem8 | APP | 20140311185200 |
| Elem20 | COMPONENT | 20140311190000 |
| ... | | ... |

FIG. 24

Layer definition table
2400

| Layer ID | Element type |
|---|---|
| ALL TENANT | ALLTENA |
| REGION/DEPT | REGION/DEPT |
| APP | APP.DBMS<br>APP.MAIL<br>APP.ARCHIVE<br>APP.VM |
| APPARATUS | APPARATUS.SERVER<br>APPARATUS.STORAGE |
| COMPONENT | COMPONENT.SERVER.CPU<br>COMPONENT.SERVER.MEMORY<br>COMPONENT.SERVER.LU<br>COMPONENT.STORAGE.PORT<br>COMPONENT.STORAGE.CACHE<br>COMPONENT.STORAGE.POOL<br>COMPONENT.STORAGE.VOLUME<br>COMPONENT.STORAGE.PG<br>COMPONENT.STORAGE.CPU |

FIG. 25

Default display metric type table
2500

| Premovement element type/metric type | Postmovement element type/metric type |
|---|---|
| ALL TENANT | REGION/DEPT: Number of alert |
| APP.DBMS: Number of alert | APPARATUS.STORAGE: IOPS |
| APP.DBMS: Number of alert | APPARATUS.SERVER: IOPS |
| APP.DBMS :Response time | APPARATUS.STORAGE: Response time |
| APP.DBMS :Response time | APPARATUS.SERVER: Response time |
| APP.DBMS :Response time | REGION/DEPT: Response time |
| ... | ... |

Threshold table
2600

| Element type/metric type | Threshold (threshold 1, threshold 2) |
|---|---|
| REGION/DEPT: Response time | (10ms, 50ms) |
| REGION/DEPT: Number of alert | (10, 20) |
| ... | ... |

FIG. 34

| Manipulation | User action for at least one of mouse and keyboard | User action for touch panel |
|---|---|---|
| Move to lower-level layer | • Cursor on (focus) target + downward wheeling<br>• Click target<br>• (In case of plural) downward wheeling with target selected<br>• (Right click + menu selection) | • Touch target + upward swiping<br>• Tap target<br>• (In case of plural) downward swiping with target selected |
| Move to higher-level layer | • Upward wheeling with target selected<br>• (Right click + menu selection) | • Downward swiping with target selected |
| Leftward movement (switching of display metric type) | • Click display metric type<br>• (Right click + menu selection)<br>• Press left cursor | • Touch arbitrary place + rightward swiping<br>• Tap display metric type |
| Rightward movement (switching of display metric type) | • Click display metric type<br>• (Right click + menu selection)<br>• Press right cursor | • Touch arbitrary place + leftward swiping<br>• Tap display metric type |
| Select target/cancel selection of target | • Double click target<br>• (Right click + menu selection) | • Double click target |
| Return | • Click [<], [>], history menu<br>• (Right click + menu selection)<br>• Press keyboard shortcut (Ctrl-B) | • Click [<], [>], history menu |
| Default display | • Click default display button<br>• (Right click + menu selection) | • Click default display button |
| Highlighting | • Drag and drop target in highlighting element designating area<br>• (Right click + menu selection) | • Drag and drop target in highlighting element designating area |
| Marking | • Press graph of element long<br>• (Right click + menu selection) | • Press graph of element long (long tap) |

MANAGEMENT SYSTEM FOR COMPUTER SYSTEM

TECHNICAL FIELD

The present invention generally relates to management of a computer system, and, more particularly, to displaying of information on a computer system.

BACKGROUND ART

A technique disclosed in PTL 1, for example, is known as displaying of information on a computer system. According to PTL 1, the topology of a computer system is displayed on a GUI (Graphical User Interface). Specifically, the GUI has a plurality of columns for each of which the types of elements to be displayed which constitute the computer system are specified. Objects representing the states of the individual elements are arranged in the respective columns.

CITATION LIST

Patent Literature

[PTL 1]
U.S. Patent Application Laid-open No. 2009/0249213

SUMMARY OF INVENTION

Technical Problem

Even with the topology display disclosed in PTL 1 being provided for a large-scaled and/or complicated computer system, a user (e.g., manager) can neither promptly grasp an element in trouble nor efficiently grasp the state of an element related to an element in trouble to analyze the cause for the trouble.

Solution to Problem

A management system (A) gives a priority to each of one or more elements matching a predetermined condition based on management information including information representing a relation among elements and information representing a metric of each of a plurality of elements, (B) displays a visual representing a visual priority given to each of at least one element based on one or more priorities given in (A), (C) when receiving selection of one of the elements from the visual displayed in (B), selects a higher-level layer or a lower-level layer of a layer containing a selected element, and selects one or more elements related to the selected element and contained in the selected layer, based on a level relation among a plurality of layers and a correlation between element types and layers, and (D) performs (A) with the one or more elements selected in (C) treated as the one or more elements matching the predetermined condition.

Advantageous Effects of Invention

Even if a computer system is at least large-scaled or complex, information on the computer system and the visibility of the relation between information are favorable.

BRIEF DESCRIPTION OF DRAWINGS

FIG. 1 illustrates one example of element management information according to an embodiment.

FIG. 2 exemplarily illustrates a first example of a tree-heat map.

FIG. 3 exemplarily illustrates a second example of the tree-heat map.

FIG. 18 illustrates one example of an element table.

FIG. 19 illustrates one example of an element measurement table.

FIG. 20 illustrates one example of a screen history table.

FIG. 21 illustrates one example of a display condition table.

FIG. 22 illustrates one example of a highlighting element table.

FIG. 23 illustrates one example of a marking table.

FIG. 24 illustrates one example of a layer definition table.

FIG. 25 illustrates one example of a default display metric type table.

FIG. 34 illustrates one example of the relation between a user manipulation and a user action.

DESCRIPTION OF EMBODIMENTS

Figure 4:
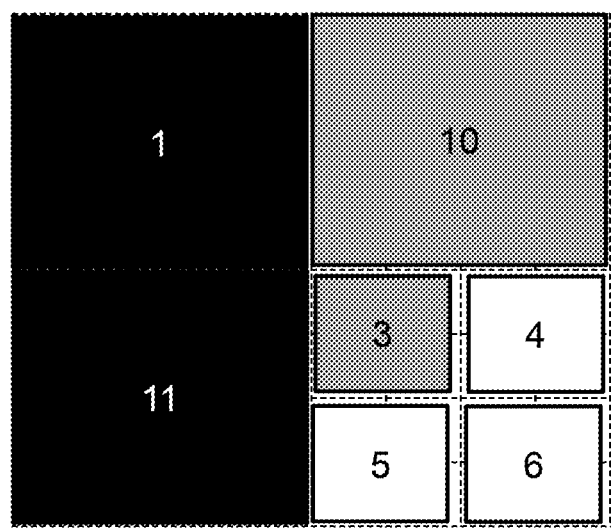
FIG. 4 exemplarily illustrates a third example of the tree-heat map.

One embodiment is described hereinafter.

While there are cases in the following description where information is described with the expression of "kkk table,"

the information may be expressed in a data structure other than a table. To show non-dependency upon a data structure, at least one of "kkk tables" may be called "kkk information."

Although a "program" may be used as the subject of a sentence in describing a process in the following description, a program, when executed by a processor (e.g., CPU (Central Processing Unit)), performs a prescribed process using a storage source (e.g., memory) and/or a communication interface and device (e.g., communication port) as needed, so that a processor may be used as the subject of a sentence for a process. A process described with a program used as the subject of a sentence may be a process that is performed by a processor or a computer including the processor. In addition, a processor may include a hardware circuit that performs a part of or all of a process. A program may be installed on each controller from a program source. The program source may be, for example, a program-distributed computer or storage medium.

The management system may be configured by one or more computers. Specifically, when a management computer displays information (specifically, when the management computer displays information on its display device, or when the management computer transmits display information to a remote display computer), for example, the management computer is the management system. When a plurality of computers achieve functions equivalent to those of the management computer, for example, the plurality of computers (which may include a display computer when the display computer implements display) are the management system. According to the embodiment, a management server 557 is a management computer, and a management client 555 is a display computer.

In the following description, "element" means a constituting element of a computer system, and specifically, is the generic name of each of a plurality of nodes (devices) constituting the computer system, and each of a plurality of components each node has. Specifically, an element is the generic name of a tenant, a department, an application program, a node (physical device), a device component, and so forth. Nodes include a physical node (e.g., server apparatus) and a logical node (e.g., program instance which is executed by a server apparatus). Likewise, components include a physical component (e.g., CPU) and a logical component (e.g., logical volume). While a name or ID is used as identification information of an element, they may be exchanged with each other, and another type of identification information may be used in place of at least one of them or in addition thereto.

In the following description, "element type" is the type of an element. "Element box" is an example of an element object, and a quadrate display object representing information of an element (e.g., identification information such as an element name). (Hereinafter, "element box" may be simply referred to as "box.") "element object" is a display object indicating an element. "Display object" is an object to be displayed on a management screen, such as an icon, line or box. "Visual" is a display object including information of at least one element, and may include, for example, at least one element box.

In the following description, "layer" is equivalent to one or more element types in a plurality of element types with defined level relations. In other words, one layer may correspond to only one element type, or may correspond to a set of two or more element types. "Layer of attention" is one layer (layer receiving attention) in a plurality of layers. A "higher-level layer" to a layer of attention is a layer higher than the layer of attention; in particular, of higher-level layers to the layer of attention, a layer higher by one level than the layer of attention is referred to as "parent layer" to the layer of attention. A "lower-level layer" to a layer of attention is a layer lower than the layer of attention; in particular, of lower-level layers to the layer of attention, a layer lower by one level than the layer of attention is referred to as "child layer" to the layer of attention. Hereinafter, when a layer is simply referred to as "higher-level layer," "parent layer," "lower-level layer" or "child layer" without specifying a reference, the layer of attention is assumed to be the reference.

In the following description, "element of attention" is one element (element receiving attention) in a plurality of elements. An element of attention belongs to a layer of attention. A "higher-level element" to an element of attention is an element related to the element of attention, and belonging to one of higher-level layers to a layer of attention. In particular, of the higher-level elements to an element of attention, an element related to the element of attention and higher by one level than the element of attention (element belonging to a parent layer) is referred to as "parent element" of the element of attention. A "lower-level element" to an element of attention is an element related to the element of attention, and belonging to one of lower-level layers to a layer of attention. In particular, of the lower-level elements to an element of attention, an element related to the element of attention and lower by one level than the element of attention (element belonging to a child layer of the layer of attention) is referred to as "child element" of the element of attention. Hereinafter, when an element is simply referred to as "higher-level element," "parent element," "lower-level element" or "child element" without specifying a reference, the element of attention is assumed to be the reference.

In the following description, "root element" is a highest-level element (equivalent to "ALL TENANT" to be described later in this element), namely, an element that does not have a higher-level element, and "leaf element" is an element that has a higher-level element but does not have a lower-level element.

In the following description, a manipulation performed on a GUI (Graphical User Interface) screen as a management screen of a computer system by a user (e.g., manager) using an input device is referred to as "user manipulation." An input device which is used in a user manipulation is generally a pointing device or a touch screen. User manipulations include, for example, "element selecting manipulation," "move-to-lower-level-layer manipulation" and "move-to-higher-level-layer manipulation." The "element selecting manipulation" may be, for example, placing the cursor of a pointing device (e.g., mouse) on an element box, or clicking of an element box with a pointing device or by touching a touch screen with a finger. A general manipulation, such as rotating a mouse wheel downward with the cursor placed on an element box or performing pinch-in on an element box on a multi-touch screen, may be applied to the "move-to-lower-level-layer manipulation." Likewise, a general manipulation, such as rotating a mouse wheel upward with the cursor placed on an element box or performing pinch-out on an element box on a multi-touch screen, may be applied to the "move-to-higher-level-layer manipulation." The "move-to-lower-level-layer manipulation" and the "move-to-higher-level-layer manipulation" may be generally referred to as "layer movement manipulation" or "go-to manipulation."

In the description of the embodiment, selection of an element box means substantially the same as selection of an element. According to the embodiment, there is a "return manipulation" as opposed to the "go-to manipulation." The "go-to manipulation" is a manipulation for viewing a visual containing the box of a parent element of a selected element (move-to-higher-level-layer manipulation) or a manipulation for viewing a visual containing the box of a child element of a selected element (move-to-lower-level-layer manipulation). By way of contrast, the "return manipulation" is a manipulation for setting the management screen back to a previously displayed management screen, and is neither of the move-to-higher-level-layer manipulation nor the move-to-lower-level-layer manipulation.

First, the outline of the embodiment is described.

The management system displays a plurality of element boxes corresponding to a plurality of elements of a computer system on at least one map in a tree map, a heat map and a tree-heat map. The "tree map" is a map expressing the visual priority of an element with at least one of the size of an element box and the position of the element box within a map. The "heat map" is a map expressing the visual priority of an element with the color of an element box (which may be another display mode such as a pattern). The "tree-heat map" is a map expressing the visual priority of an element according to both definitions of the tree map and the heat map, i.e., an integrated map of the tree map and the heat map. The embodiment uses the tree-heat map.

The following illustrates one example of display control for the tree-heat map. It is to be noted that at least one of the tree map, the heat map and the tree-heat map may correspond to the definition of "visual." A region where a map (visual) is displayed (drawn) may be called "main visual region." A visual (map) which is displayed in the main visual region may be called "main visual."

(1) Determination of Priority

The management system retains element management information as illustrated in FIG. 1. This information may be at least a part of, for example, a management table group 542 (see FIG. 6) to be described later the management system has. The element management information has an element ID for each element the computer system has. The element management information also has a metric and a standardization value (SV) for each of one or more metric types. The metric types include, for example, a response time (time from the issuance of a request till reception of a response), IOPS (the number of I/Os per second), a data transfer rate (data transfer speed), and the number of alert events (the number of events which have generated an alert). The "metric" is a value of measurement (e.g., 14 ms (milliseconds)) for a metric type (e.g., response time). The "standardization value" is a value determined to compare the sizes of different metric types based on the same reference.

When there are a plurality of metric types, the management system determines the priority for each element based on a worst metric. The priority determined for each element this way is called "worst priority." The size and position of an element box which is displayed on a tree-heat map are determined based on the worst priority of an element corresponding to that box. Accordingly, even when a display metric type is changed, the position (position on the main visual region) of the element box and the size thereof are not changed. It is to be noted that the "display metric type" is a metric type selected as a display condition (metric type drawing an attention of the user) from a plurality of metric types.

Even when the metrics of different metric types are simply compared with each other, it is difficult to determine which metric is superior. For example, when the worst response and the worst IOPS which are respectively "100" are simply compared with each other, it is difficult to determine which metric is superior.

According to the embodiment, therefore, the metric of each metric type is standardized for each element according to a predetermined transformation rule (e.g., conversion equation). In other words, the metric is converted to a standardization value. Then, the worst priority is determined for each element based on the standardization value of the worst one of a plurality of standardization values. The following describes a specific example.

First, standardization of metric is carried out as follows, for example. A predetermined number of thresholds, e.g., two thresholds (threshold 1 and threshold 2), are defined for each metric type. The threshold 1 is a threshold (alert threshold) that is used in determining whether an alert should be generated, and the threshold 2 is a threshold (error threshold) that is used in determining whether there is an error. When a metric exceeds the threshold 2, it is determined as an error, whereas when a metric does not exceed the threshold 2 but exceeds the threshold 1, an alert is generated. According to the embodiment, the standardization value of a metric is determined depending on, for example, whether the metric type exceeds the threshold 2, whether the metric does not exceed the threshold 2 but exceeds the threshold 1, or whether the metric is less than the threshold 1. Specifically, for example, the standardization value of a metric which exceeds the threshold 2 is set to "3," the standardization value of a metric which is equal to or less than the threshold 2 and exceeds the threshold 1 is set to "2," and the standardization value of a metric which is equal to or less the threshold 1 is set to "1." This example is for a case where as the metric becomes larger, the severity becomes greater. When the severity becomes greater as the metric becomes smaller, the relation is reversed. In the example of FIG. 1, the severity becomes greater as the value of the response time becomes larger, so that threshold 2>threshold 1 (e.g., threshold 2=50, threshold 1=10). The severity becomes greater as the value of the IOPS becomes lower than the reference value in case of management from the viewpoint of Qos (Quality of service), so that threshold 2<threshold 1 (e.g., threshold 2=50, threshold 1=100).

The number of thresholds may be one or 3 or more. The number of thresholds may be the same for all metric types, or may vary according to the metric types (the number of thresholds is 2 for all metric types). Another method may be adopted as a method of converting a metric type to a standardization value. For example, the number of thresholds may be 3 or more for at least one metric type, and the standardization value may be determined based on 3 or more thresholds. Alternatively, the standardization value may be determined by a method which does not use the threshold of a metric.

The standardization value is determined metric type by metric type for each element in the above-described manner. The worst priority of an element is determined based on the worst (highest) standardization value among a plurality of standardization values corresponding to that element. For example, the worst priority is "3" (highest) for the worst standardization value is "3," for example, the worst priority is "2" (second highest) for the worst standardization value is "2," and the worst priority is "1" (lowest) for the worst standardization value is "1." According to the example of FIG. 1, the worst priority of each of elements 1, 10 and 11 (elements with element IDs of "1," "10" and "11") is "3," the worst priority of each of elements 3 to 9 is "2," and the worst priority of each of other elements 2 and 12 to 15 is "1." The worst priority may be set in greater stages; for example, the worst priority may be determined based on the details of a plurality of standardization values respectively corresponding to a plurality of metric types (e.g., the number of each of the standardization values "3" to "1"), the weight of each of a plurality of metric types, and the like.

The worst priority is determined element by element in the above-described manner.

(2) Color of Element Box

Based on the standardization value of an element for a display metric type, the color of an element box corresponding to that element is determined. According to the example of FIG. 1, the color of an element box corresponding to an element with a standardization value of "3" is black, the color of an element box corresponding to an element with a standardization value of "2" is gray, and the color of an element box corresponding to an element with a standardization value of "1" is white. With a display metric type being changed, the color of an element box is changed for an element whose standardization value varies between the display metric type before the change and the display metric type after the change. Meanwhile, the size and position of an element box are not changed even when the display metric type is changed. This is because, as will be described later, the size and position of an element box are determined based on the worst priority (worst standardization value which is a standardization value corresponding to the worst priority), and the worst priority is not changed even when the display metric type is changed.

(3) Size of Element Box

Based on a standardization value corresponding to the worst priority of an element, the size of an element box corresponding to that element is determined. For example, it is assumed that the width is $A \times 2^n$, the height is $B \times 2^n$ where n is (worst standardization value−1), A is the width when the worst standardization value is "1" and B is the height when the worst standardization value is "1." In the following example, it is assumed that A=B=1.

(4) Size of Main Visual Region (Region where a Tree-Heat Map is Displayed (Drawn))

The main visual region is quadrate, for example, with a width of $A \times 2^N$ and $B \times 2^N$ where N is a natural number equal to or larger than the maximum value of obtainable standardization values. In the following example, N=the maximum value of obtainable standardization values=3, so that the width of the main visual region is $1 \times 2^3 = 8$, and the height of the main visual region is also $1 \times 2^3 = 8$. In other words, in the following example, the main visual region is a matrix of 8 rows by 8 columns, and thus has 64 cells.

(5) Position of Element Box (Position on the Main Visual Region)

Element boxes are arranged in the order of higher-to-lower display priority from a top row. It is to be noted that the rows are arranged from the upper left (the arrangement may start from the upper right). There is a case where an element box with a next display priority is arranged at a midpoint in a row. Alternatively, element boxes may be arranged in the order of higher-to-lower display priority from a top of a left (or right) column. At this time, element boxes may be arranged from a position close to an upper left (upper right).

Here, the "display priority" is a priority determined based on the worst priority. The display priority accords to the levels of the worst priorities when the worst priorities are different, and follows a predetermined rule when the worst priorities are the same. For example, the display priorities of elements with the same worst priority may be arranged in the descending order (or in the ascending order) of the element ID (number), in the order of the capitals of element names, in the order of metrics having greater severity, or in consideration of the designation of the priority by a user as will be described later. It is desirable that the display priority that is determined according to such a rule should not be changed even when the display metric type is changed. Further, for an element X, for example, the following expression can hold, metric with a metric type T=threshold 1+interpolation coefficient (threshold 2−threshold 1) and the interpolation coefficient may be calculated from the equation; however, the maximum value of the interpolation coefficient may be determined for each element, and at least one of the position of an element box (display priority of an element) and the size thereof may be determined according to the determined interpolation coefficient. Of course, the interpolation coefficient may be determined according to another interpolation algorithm, and the interpolation algorithm may vary according to the metric type. In the above equation, "threshold 1" may be a threshold 1 corresponding to the element X and the metric type T, and "threshold 2" may be a threshold 2 corresponding to the element X and the metric type T.

The metrics are in the time sequence for each of a plurality of metric types, so that in determining the worst priority, the interpolation coefficient, the standardization value or the like, the management system can select a worst metric (individual worst metric) in a plurality of metrics in a predetermined period, and determine a plurality of standardization values respectively corresponding to a plurality of metric types, the worst priority based on the worst standardization value in a plurality of standardization values, the aforementioned interpolation coefficient or the like, based on a plurality of individual worst metric types respectively corresponding to a plurality of metric types. The standardization value may be calculated for each metric to specify a worst standardization value from a plurality of standardization values in a predetermined period. In addition, the "predetermined period" may be a "display period" which is specified as one of display conditions.

FIG. 2 illustrates one example of a tree-heat map (main visual) according to the above-described rule and the element management information in FIG. 1.

FIG. 2 exemplarily illustrates a tree-heat map when the display metric type is a response time.

Referring to FIG. 2 (and FIGS. 3 to 5), a numeral within an element box is an element ID. The management system controls the size, position (position on the main visual region) and color of an element box. The main visual region is a matrix of 8 rows by 8 columns as in the above-described example. While the matrix is expressed by a broken line in FIGS. 2 to 5 for easier illustration (for visual identification) of the structure of the main visual region, actually, the main visual region (e.g., the frame border and ruled lines) may not be displayed in visually identifiable manner.

The size of an element box is a size according to the worst priority (worst standardization value) of an element corresponding to the box. Specifically, an element box with a worst priority of "3" (element box of elements 1, 11 and 10) is an element box with width: 4 $(=1 \times 2^{(3-1)})$ and height: 4 $(=1 \times 2^{(3-1)})$. An element box with a worst priority of "2" (e.g., element box of elements 3 to 6) is an element box with width: 2 $(=1 \times 2^{(2-1)})$ and height: 2 $(=1 \times 2^{(2-1)})$.

The position of an element box accords to the display priority of an element corresponding to that box. The display priorities of elements with the same worst priority are arranged in the ascending order of the element ID. In other words, referring to FIG. 2, first, the element boxes 1 and 10 in the three element boxes 1, 10 and 11 with a worst priority of "3" (highest) are arranged rightward from the upper left, and then the element box 11 is arranged from the upper left of a lower empty region. Next, the element boxes 3 and 4 in the seven element boxes 3 to 9 with a worst priority of "2" are arranged rightward from the upper left of an empty region in the main visual region, and then the element boxes 5 and 6 are arranged rightward from the upper left of a lower empty region.

At this point of time, no empty region is present in one main visual region. In this case, the management system may carry out, for example, one of the following display controls (e.g., display control in a plurality of display controls which is selected by the user).

(2-1) The management system skips displaying of other element boxes. In other words, it is not essential that the tree-heat map (and tree map) should contain all element boxes. In this display control, elements 2 and 12 to 15 whose worst priorities are equal to or less than a predetermined priority (e.g., "1") are not included in the map (visual). This display control also achieves visual identification of an element box with a relatively high worst priority.

(2-2) The management system adds one or more main visual regions of 8 rows by 8 columns to a layout region to be described later, and arranges the element boxes 7 to 9 with a worst priority of "2" and the element boxes 2 and 12 to 15 with a worst priority of "1" in the added main visual region (see FIG. 3). The element boxes arranged in the added main visual region displayed by changing (e.g., scrolling), for example, the display range (the range in the layout region which is actually displayed). Changing the display range (e.g., scrolling) permits either one of the map in FIG. 2 and the map in FIG. 3 to be displayed. A map resulting from coupling the map in FIG. 2 and the map in FIG. 3 may be construed as a single map, and the map in FIG. 2 may be construed as a first map portion while the map in FIG. 3 may be construed as a second map portion.

(2-3) The management system decreases the sizes of element boxes (i.e., the boxes are reduced) in such a way that a predetermined number of or more element boxes, or element boxes with worst priorities equal to or greater than a predetermined worst priority can be accommodated in a single main visual region. Specifically, for example, the management system decreases at least one of the values of the aforementioned A and B, and increases the value of the aforementioned N (parameter in the equation of calculating the size of the main visual region). Accordingly, the number of cells in the main visual region (at least one of the number of rows and the number of columns) increases while maintaining the size of the main visual region, resulting in that a larger number of element boxes can be arranged in a single main visual region.

(2-4) The management system increases the value of the aforementioned N (parameter in the equation of calculating the size of the main visual region) without decreasing the values of the aforementioned A and B. This enlarges the main visual region. Although the main visual region is displayable within the display range before the size enlargement, the size enlargement may prevent the main visual region from being fitted in the display range. In this case, the user changes (e.g., scrolls) the display range to visually identify a plurality of element boxes arranged in the main visual region.

(2-5) The management system receives adjustment of the threshold 1 and the threshold 2 for at least one metric type, calculates the standardization value and the worst priority based on the threshold 1 and the threshold 2 after adjustment, and draws a plurality of element boxes again based on the calculation result. It is needless to say that the worst priority is recalculated even when the display period is changed.

Even an empty region of a predetermined size or larger remains in one main visual region even if the element boxes of all the elements are arranged in the main visual region, the management system may increase the size of at least one element box.

The following is, for example, the reason why power of 2 is a multiplier for both of the size of an element box and the size of the main visual region in the foregoing description. The gaps between element boxes are aligned to given an impression that the element boxes are arranged in a visually organized fashion. It is to be noted that may be n (=worst standardization value−1) for the size of an element box and N (=a predetermined value equal to or larger than the maximum value of the obtainable standardization values) instead of power of 2.

Figure 5:
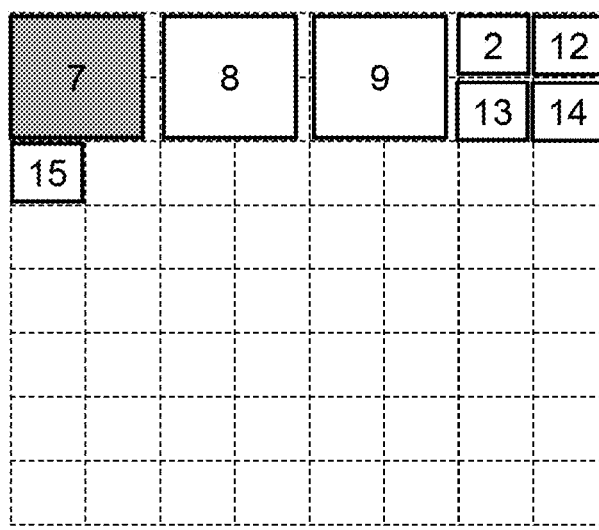
FIG. 5 exemplarily illustrates a fourth example of the tree-heat map.

When the display metric type is changed to IOPS with the visual in FIG. 2 being displayed, the management system sets the color of each element box to a color according to the standardization value corresponding to a display metric type after the change as illustrated in FIG. 4 without changing the size and position of each element box. The color within each element box in FIG. 3 corresponds to the example of FIG. 1 (color of a cell showing the standardization value of IOPS for each element). When the display metric type is changed to IOPS with the visual in FIG. 3 being displayed, the management system likewise controls the color without changing the size and position of each element box, as illustrated in FIG. 5.

Because changing the display metric type does not change the size and position of an element box, the user is easy to see the display, making it easier to change the display metric type.

The embodiment is described below in detail.

Figure 6:
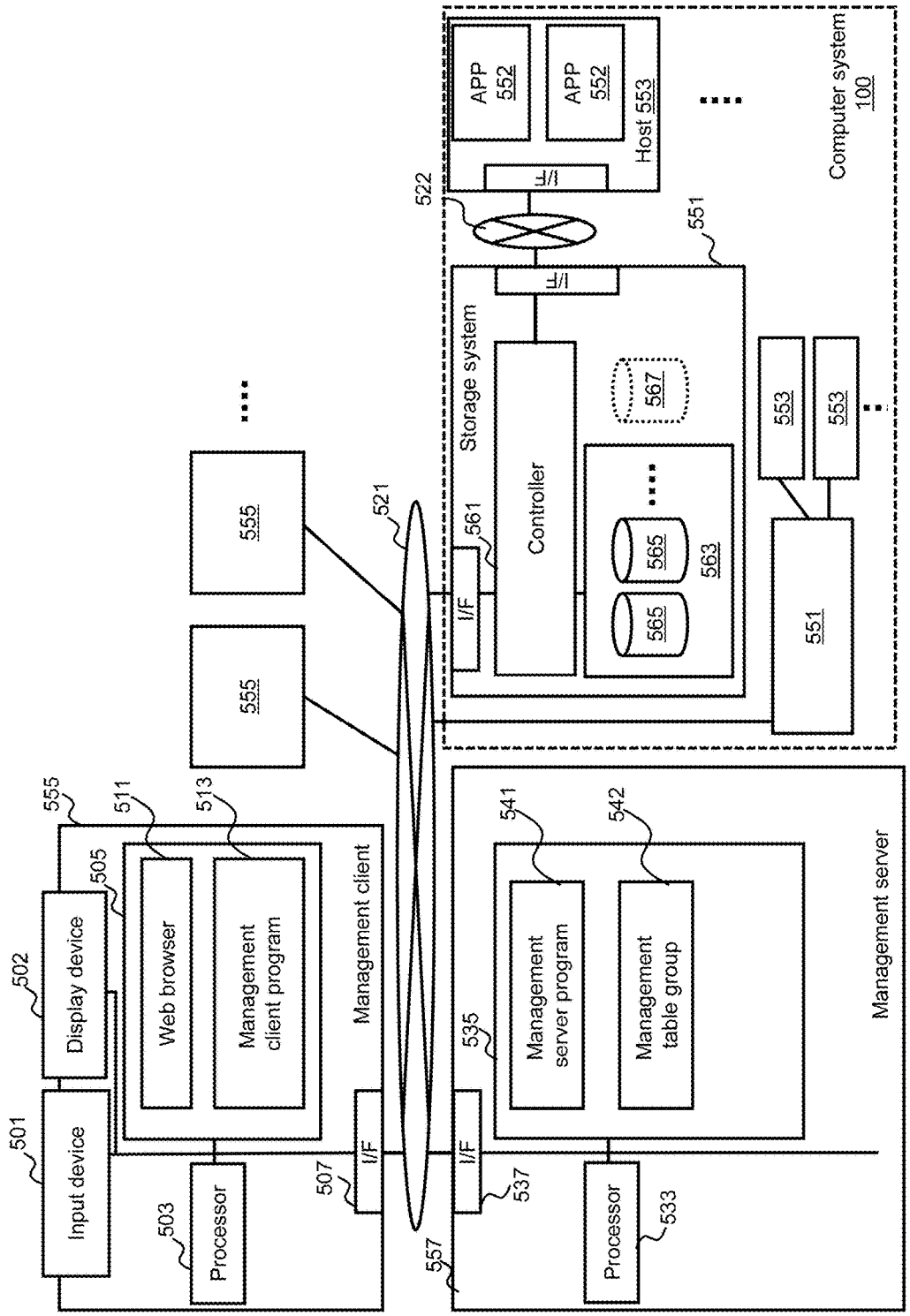
FIG. 6 illustrates the configuration of a computer system and a management system according to the embodiment.

FIG. 6 illustrates the configuration of a computer system and a management system according to the embodiment.

A computer system 100 includes one or more hosts 553 and one or more storage systems 551 connected thereto. The hosts 553 are coupled to the storage system 551 over, for example, a communication network 522 (e.g., SAN (Storage Area Network) or LAN (Local Area Network)).

The storage system 551 includes a physical storage device group 563 and a controller 561 connected thereto.

The physical storage device group 563 includes at least one PG (Parity Group). The PG is sometimes referred to as RAID (Redundant Array of Independent (or Inexpensive) Disks) group. The PG includes a plurality of physical storage devices, and stores data according to a predetermined RAID level. The physical storage device is, for example, HDD (Hard Disk Drive) or SSD (Solid State Drive).

The storage system 551 has a plurality of logical volumes. The logical volumes include a substantive logical volume (real volume) 565 based on the PG, and a virtual logical volume (virtual volume) 567 according to thin provisioning or storage virtualization. A single storage system 551 should not necessarily have plural types of logical volumes. For example, the storage system 551 may have only the real volume 565 as a logical volume. A storage area is allocated to a virtual volume according to thin provisioning from a pool. The pool is a group of storage areas based on one or more physical storage devices (e.g., RGs (RAID (Redundant Array of Independent (or Inexpensive) Disks) Groups), and may be a set of one or more logical volumes, for example.

The pool may be a pool where the difference between an original logical volume and a snapshot is stored, in place of a pool having a storage area to which a virtual volume according to thin provisioning is allocated.

The controller 561 includes a blade (circuit board) having a plurality of devices such as a port and MPB (one or a plurality of microprocessors (MP)), and a cache memory. For example, the port receives an I/O (Input/Output) command (write command or read command) from the host 553, and the MP of the MPB controls the I/O of data according to the I/O command. Specifically, for example, the MP specifies the logical volume at the I/O destination from the received I/O command, and performs I/O of data with respect to the specified logical volume. The data to be input to and output from the logical volume is temporarily stored in the cache memory.

The host 553 may be a physical computer or a virtual computer. The host 553 executes one or more application programs (APP) 552. As the APP 552 is executed, the I/O command specifying the logical volume is transmitted from the host 553 to the storage system 551.

As described above, the computer system 100 has a plurality of hierarchical elements. Specifically, the plurality of elements include two or more types of elements in the APP 552, the host 553, the storage system 551, the controller 561, the port, the MPB, the cache memory, the logical volume and the PG or the like. As the "element," there may be a substantive element such as an APP or a logical volume and a virtual element which is a group of a plurality of substantive elements.

The management system includes a management server 557, and one or more management clients 555 coupled to the management server 557. The management server 557 is connected with the management client 555 over a communication network (e.g., LAN, WAN (World Area Network) or the Internet) 521.

The management client 555 includes an input device 501, a display device 502, a storage device (e.g., memory) 505, a communication interface device (hereinafter I/F) 507, and a process (e.g., CPU (Central Processing Unit)) 503 coupled to those components. The input device 501 is, for example, a pointing device and a keyboard. The display device 502 is, for example, a device having a physical screen on which information displayed. A touch screen which is the integration of the input device 501 and the display device 502 may be used. The I/F 507 is coupled to the communication network 521 so that the management client 555 can communicate with the management server 557 via the I/F 507. It is to be noted that the communication network 521 may be partly or entire common to the network that connects the host 553 to the storage system 551.

The storage device 505 has at least a main storage device (typically, memory) in the main storage device and an auxiliary storage device. The storage device 505 can store a computer program that is executed by the processor 503, and information to be used by the processor 503. Specifically, for example, the storage device 505 stores a Web browser 511 and a management client program 513. The management client program 513 may be an RIA (Rich Internet Application). Specifically, for example, the management client program is a program file, and may be downloaded from the management server 557 (or another computer) to be stored in the storage device 505.

The management server 557 includes a storage device 535, an I/F 537, and a process (e.g., CPU (Central Processing Unit)) 533 coupled to those components. The I/F 537 is coupled to the communication network 521 so that the management server 557 can communicate with the management client 555 via the I/F 537. The management server 557 can receive an instruction according to a user manipulation or draws a display object in the layout region via the I/F 537. Accordingly, the I/F 537 is an example of the I/O interface device.

The storage device 535 has, for example, at least a main storage device (typically, memory) in the main storage device and an auxiliary storage device. The storage device 535 can store a computer program that is executed by the processor 533, and information to be used by the processor 533. Specifically, for example, the storage device 535 stores a management server program 541 and a management table group 542. The management table group 542 is one or more tables holding the hierarchical relation among a plurality of elements the computer system 100 has, the presence/absence of an error in each element, and the like, and includes tables illustrated in FIGS. 18 to 26, for example. At least part of information held in the management table group 542 may be collected by the management server program 541 or acquired by accessing to another management system that holds information. The management server program 541 receives an instruction according to a user manipulation from the management client 555, and transmits information to be drawn in the layout region to the management client 555.

The cooperating process of the management server program 541, the Web browser 511 (or RIA execution environment of a client) and the management client program 513 achieves GUI screen display according to a user manipulation. The following are examples of the cooperation. (Cooperating operation example 2) is used in the embodiment.

Cooperating Operation Example 1

The management server program 541 transmits at least part of information the management table group 542 holds to the Web browser 511 (or management client program 513), and stores it in the storage device 505 as temporary information. The Web browser 511 (or management client program 513) draws a display object in the layout region (e.g., newly draws, enlarges or reduces the display object) based on an instruction according to a user manipulation and temporary information.

Cooperating Operation Example 2

The management server program 541 receives an instruction according to a user manipulation for the display screen from the Web browser 511 (or management client program 513), creates information for displaying a display object based on the instruction and the management table group 542, and transmits the display information. The Web browser 511 (or management client program 513) receives the display information, and draws the display object in the layout region according to the display information. In other words, in brief, the management server program 541 draws the display object in the layout region. When a user manipulation for the GUI screen is performed, the Web browser 511 (or management client program 513) transmits an instruction according to the user manipulation to the management server program 541.

Hereinafter, to avoid redundant descriptions, it is assumed that display control is performed by the management server program 541.

Recently, computer systems have become large in scale and complex due to, for example, at least one of the following situations as a factor.

(*) Processes to be handled by computer systems are scaled up.

(*) Multiple processes like the cloud service are executed by computer systems.

(*) The types of nodes in computer systems have increased.

(*) The internal configurations of nodes have become complex, increasing the types of components (e.g., logical components and physical components) constituting a module, which makes it necessary to manage those types.

(*) Virtualization (e.g., server virtualization, network virtualization, storage virtualization, data center virtualization) has infiltrated to achieve division and aggregation of apparatuses.

(*) The deploy and migration techniques have progressed.

Here, "scaled up" indicates an increase in the number of elements to be managed in a computer system, such as nodes constituting the computer system and components of the nodes. "Complex" indicates at least one of the relation among elements becoming M:1, 1:N or M:N as a result of an increase in the number of types of elements to be managed (where M and N are each an integer equal to or larger than 2), an increase in the value of at least one of M and N, and a change in the relation among elements with time.

Meanwhile, according to the general topology display technique, display objects of elements to be displayed are all displayed, and lines are displayed between display objects to represent the relation among elements. However, when the general topology display technique is used in a large-scaled and complex computer system, a user cannot efficiently and promptly grasp an element in trouble and cannot grasp the states of relevant elements for the analysis of the element. At least one of the following is the reason.

(A) In case of large scaling, the number of display objects to be displayed increases so much that the efficiency drops. For example, an attempt to display the display objects of all the elements on one screen causes the sizes of the display objects of the individual elements to become smaller. To keep the sizes of the individual display objects, on the other hand, the display objects of all the elements cannot fit in one screen so that the user needs to grasp the relation among elements while scrolling the screen, which is troublesome.

(B) When the number of element types increases, there is a limit to distinguish the element types based on at least one of the shape and color of display objects. As a matter of fact, when the size of a display object becomes too large, the number of display objects that can be displayed on one screen becomes smaller, but expressing multiple element types with small-sized icons is not efficient for the user.

(C) The large scaling and/or complication of a computer system causes multiple display objects and relational lines between display objects to be displayed. This makes it difficult to grasp the relation among elements.

(D) Suppose that for easier viewing of topology, the management system can arrange display objects on the screen in such a way as to avoid overlapping of relational lines as much as possible in consideration of the relation among elements. When the relation among elements varies time-sequentially, however, this function (function to adjust the layout positions of display objects) causes the arrangement of the display objects on the screen to vary before and after the change in the relation among elements. As a result, the user cannot efficiently find out a desired display object from the screen.

In view of the above, the present Applicant proposes a management system that provides, for example, the following functions as a management system for achieving the purpose originally intended by the user "to promptly grasp an element in trouble and grasp the state of an element related to the element in trouble to analyze the cause for the trouble." The management system can be expected to efficiently achieve the purpose originally intended by the user.

(i) The management system determines the visual priority of an element based on the state of the element. This permits the user to promptly grasp an element in trouble.

(ii) A level relation is defined between element types. Then, the management system displays a visual representing information of a predetermined element (e.g., selected element). To display an element related to the predetermined element, the management system enlarges the display region for the display object (e.g., box) of the predetermined element in the previously displayed visual ("first visual" at this stage), and displays a visual including the display object of the element related to the predetermined element ("second visual" at this stage) in the enlarged display region. This permits the user to grasp information of the element step by step and avoid excess information to be displayed. Even from the viewpoint of the management system, display of an unnecessary box can be avoided so that the load on the display process can be reduced. It is to be noted that the second visual should better not include the display object of an element which is not related to the predetermined element. This can further achieve the avoidance of the aforementioned excess information and the reduction in the load on the display process.

It is to be noted that the enlarged region (enlarged display region) should better in such a positional relation as to include the display region of the display object of a predetermined element. This allows the user to grasp the enlarged region even if the center of the line of sight is fixed to the display region of prior to the enlargement, thus lightening the visual load.

Figure 7:
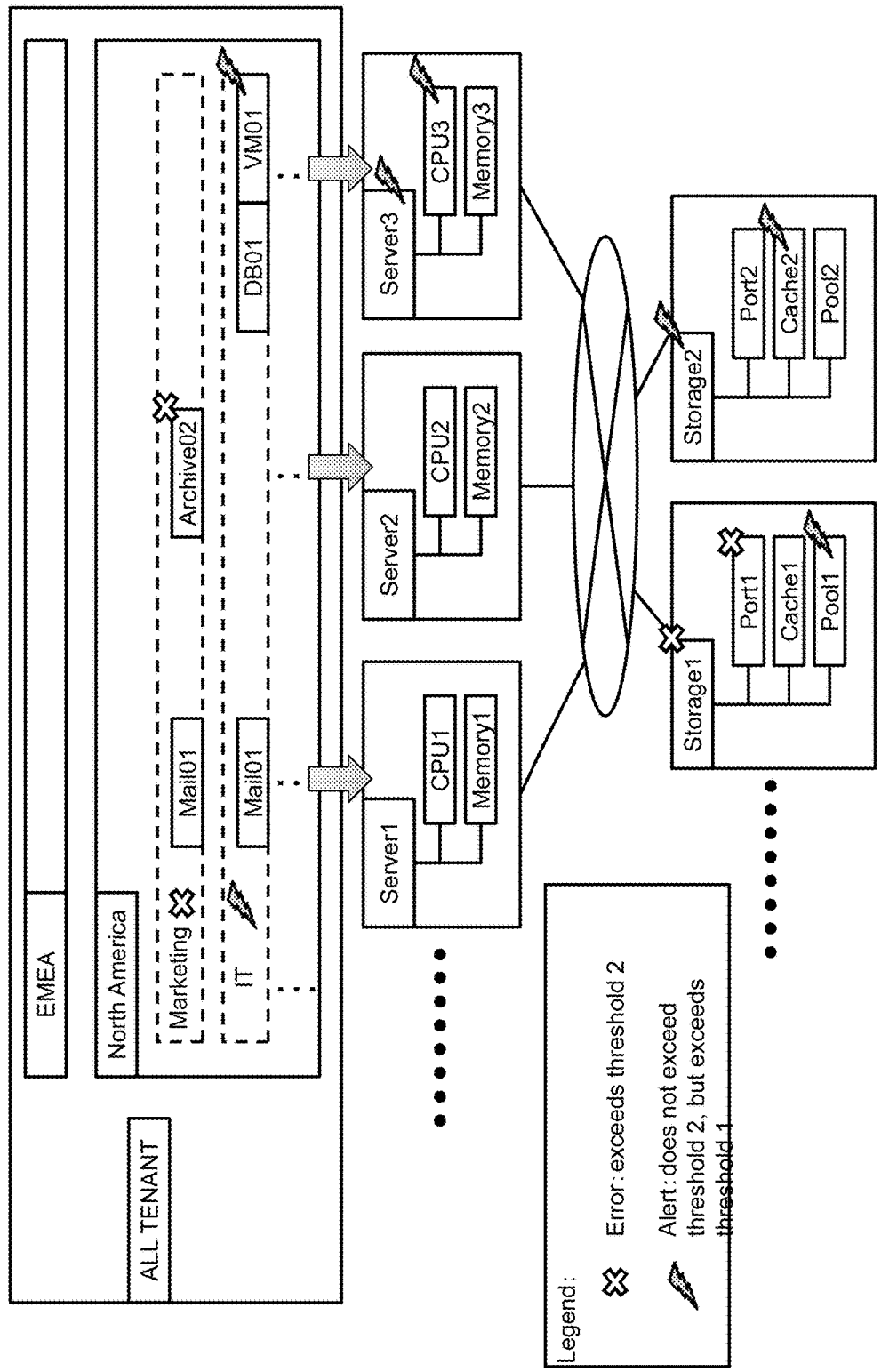
FIG. 7 illustrates one example of the hierarchy of the computer system.
Figure 8:
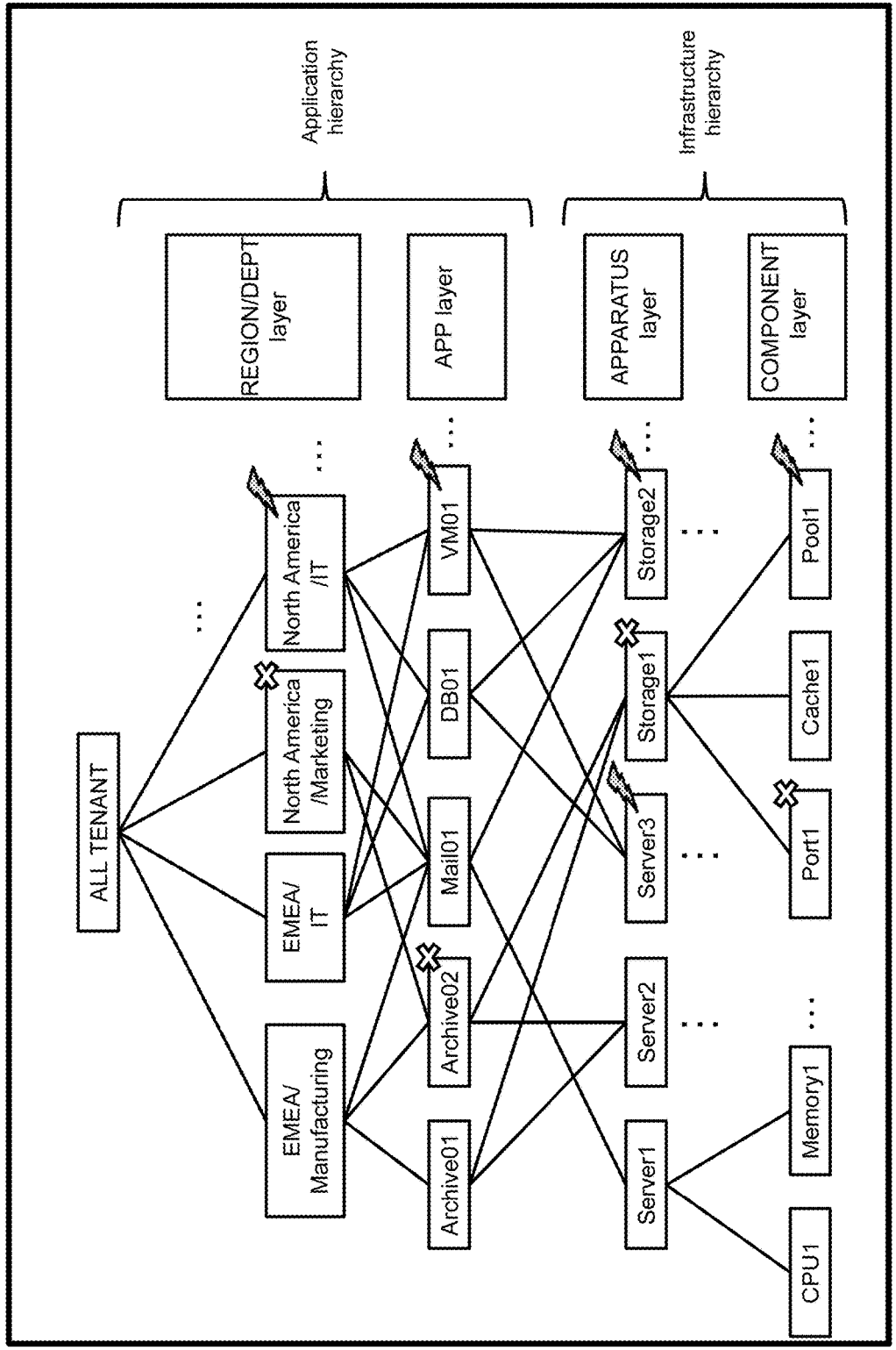
FIG. 8 illustrates one example of the topology of the computer system.

FIG. 7 illustrates one example of the hierarchy of the computer system 100. FIG. 8 illustrates one example of the topology of the computer system 100. As apparent from FIGS. 7 and 8, the computer system 100 is roughly divided into an application hierarchy (e.g., the logical configuration of an element) and an infrastructure hierarchy (e.g., the physical configuration of an element), at least one highest-level element in the infrastructure hierarchy is related to at least one terminal element in the application hierarchy so that the application hierarchy and the infrastructure hierarchy are associated with each other. For example, the following is the topology configuration of the computer system 100.

(*) Each element belongs to a layer corresponding to the element type of that element. As described above, "layer" is equivalent to one or more element types in a plurality of element types whose level relations are defined. A plurality of element types may correspond to a single layer. In other words, when it is unnecessary to treat a plurality of element types collectively, a layer is an element type itself.

(*) The "ALL TENANT" element represents the whole computer system, and is a root element. "ALL TENANT" is one of element types.

(*) The level relation among layers is "REGION/DEPT," "APP," "APPARATUS" and "COMPONENT" from the top. "REGION/DEPT" and "APP" are one of more layers the application hierarchy has, and "APPARATUS" and "COMPONENT" are one of more layers the infrastructure hierarchy has.

(*) "REGION" is one of element types, and the "REGION" element is an element belonging to "REGION" and is a region, for example. "DEPT" is one of element types, and the "DEPT" element is an element belonging to "DEPT" and is a department, for example. When a task that the computer system performs is included, it may be desirable to manage "APP" elements (e.g., program instances) grouped task by task, for which a "DEPT" layer can be introduced. According to the embodiment, it is assumed that computer systems are distributed in a plurality of regions, which results in a management mode such that a "REGION" element is introduced and as illustrated in FIG. 8, the "DEPT" element is included (belongs to) in the "REGION" element. When it is desirable to achieve grouping from the viewpoint of tasks rather than regions, the above relation can be reversed. According to the embodiment, the "REGION" element and the "DEPT" element are integrated.

(*) "APP" is one of element types, and the "APP" element is an element belonging to "APP" and is an application program, for example. "APP" elements are, for example, instances of programs that run on computer systems (particularly, server apparatus), which specifically include the following: an instance of DBMS (DataBase Management System) (e.g., "DB01" element), an instance of a mail server program (the program may be considered as a single instance, or when the program is configuration to receive mails from a plurality of domains, it may be considered that instances exist domain by domain) (e.g., "Mail01" element), an instance of a Web server (when the Web server has multi-domain compatibility, it may be considered that instances exist domain by domain), a virtual machine (e.g., "VM01" element), and an archive program (e.g., "Archive02" element).

(*) "APPARATUS" is one of element types, and the "APPARATUS" element is an element belonging to "APPARATUS" and is, for example, a physical apparatus that physically constituting the computer system. The "APPARATUS" elements include, for example, a server apparatus (e.g., "Server1" element) and a storage apparatus (e.g., "Storage1" element), at least one of which may be replaced with or may be added with a network apparatus such as a switch.

(*) "COMPONENT" is one of element types, and the "COMPONENT" element is an element belonging to "COMPONENT" and is, for example, a logical or a physical component of an apparatus that physically constituting the computer system. The "COMPONENT" elements include, for example, a CPU (e.g., "CPU1" element), a memory (e.g., "Memory1" element), a port (e.g., "Port1" element), a cache memory (e.g., "Cache1" element), and a pool (e.g., storage area (e.g., aggregation of one or more logical volumes) where data which is associated with a virtual volume like a logical volume according to thin provisioning and is to be stored in the virtual volume is stored (e.g., "Pool1" element), at least one of which may be replaced with or may be added with another apparatus component. It is to be noted that while the "COMPONENT" layer is configured to be a single layer in the embodiment, a plurality of "COMPONENT" layers may exist. This is because when a certain type of component is related to (e.g., included in) another type of component, for example, one may want to perform the manipulation to "go to" the layer of this another type of component.

(*) FIG. 8 shows the following, for example. That is, "Marketing" department is present in a "North America" region, and the "Archive02" element which is managed by the "Marketing" department is executed by a "Server2" element. The "Archive02" element access a logical volume provided by the "Storage1" element. The "Storage1" element has the "Port1" element, the "Cache1" element, and the "Pool1" element.

(*) There is at least one threshold for each of one or more metric types for each element type (or for each element). According to the embodiment, there are two thresholds, threshold 1 and threshold 2, as mentioned above. It is assumed that for example, there are the response time and the number of alert events as metric types, the threshold 2 is "50" and the threshold 1 is "10" for the response time (unit is millisecond, for example), and the threshold 2 is "20" and the threshold 1 is "10" for the number of alert events. It is also assumed that referring to FIGS. 7 and 8, errors have occurred for both of the response time and the number of alert event due to the influence of Queue Full of, for example, the "Port1" element, resulting in occurrence of a response time error for the "Storage1" element, "Archive02" element and "Marketing" element of "North America" and occurrence of an alert for the number of alert events for the "Pool1" element. It is further assumed that an alert on the response time has occurred for the IT element, "VM01" element, "Server2" element and "Server3" element. It is assumed that with regard to the "Marketing" element of "North America" and IT element of "North America" for which one example of metrics is illustrated in a table in FIG. 19 (see FIG. 19 with "Perf6" and "Perf7" in FIG. 18 used as keys), errors and alerts exemplified in FIGS. 7 and 8 have occurred in consideration of the one example and the aforementioned examples of the thresholds.

<User Manipulations Needed for Management System>

The management system may receive at least one of the following user manipulations. In the following description, a visual of an element of attention (typically, a visual including the box of a child element of the element of attention) may be referred to as "main visual."

(Manipulation 1) A selection manipulation for one of element boxes in the main visual and a move-to-lower-level-layer manipulation for that element box. In other words, the manipulation 1 displays a visual containing the box of a child element of the selected element as a new main visual.

(Manipulation 2) A manipulation to return the main visual displayed by the manipulation 1 to the original one. In other words, the manipulation cancels the main visual displayed by the manipulation 1, and displays the main visual which has been displayed before execution of the manipulation 1.

This is because that when the management system is operated to analyze the cause for a trouble, for example, the following actions seem to be typical as user actions.

(Step A) The user finds an element in trouble from the main visual.

(Step B) To analyze the cause for the trouble, the user visually identifies the new main visual where a child element of an element in trouble is treated as an element of attention in the manipulation 1.

(Step C) When the user has found an element which may be the cause as a result of visually identifying the new main visual, the user recursively performs Step B.

(Step C') When the user has not found an element which may be the cause as a result of visually identifying the new main visual, the user repeats the manipulation 2 to return to an adequate main visual and performs the manipulation 1 for the box of another element from the adequate main visual to look for the cause.

There may be a case where during visual identification in Step B and Step C, the user wants to grasp the range of influence of the trouble state of an element corresponding to a trouble state box included in the main visual onto a higher-level layer. However, the manipulation 2 merely achieves returning of a visual, and does not display all higher-level elements (parent elements) related to an element in trouble.

Suppose that the user has performed the following manipulations (see FIG. 8).
(8-0) As the initial state, the main visual of an "ALL TENANT" element (hereinafter, initial visual) is displayed.
(8-1) The user selects "North America/Marketing" box from the initial visual, and performs the manipulation 1. Then, a main visual (APP layer visual) containing a "Archive02" box and a "Mail01" box is displayed.
(8-2) The user selects "Archive02" box from the APP layer visual, and performs the manipulation 1. Then, a main visual (APPARATUS layer visual) containing a "Server02" box and a "Storage1" box is displayed.

In the state of (8-2), while the "Archive01" element and the "Archive02" element are expected to be displayed as higher-level elements which may be influenced by the "Storage1" element, only the "Archive02" element in those elements is displayed. For this reason, the management system may receive the following user manipulation.
(Manipulation 3) A selection manipulation for one of element boxes in the main visual and a move-to-higher-level-layer manipulation for that element box. In other words, the manipulation 3 displays a visual containing the box of a parent element of the selected element as a new main visual.

There may be case where the management system receives a "return manipulation" corresponding to the manipulation 3. This manipulation may be set the same as the manipulation 2 to simplify the operation of the management system.

As the gist of the manipulations 1 to 3, and the return manipulation corresponding to the manipulation 3, the management system receives the following manipulations.
(Move-to-lower-level-layer manipulation) A manipulation to display a visual containing a child element of an element selected from the main visual as a new main visual. When this manipulation is performed, identification information of an element of attention (main visual) before the element selection may be registered at the end of history information (e.g., screen history table to be described later).
(Move-to-higher-level-layer manipulation) A manipulation to display a visual containing a parent element of an element selected from the main visual as a new main visual. When this manipulation is performed, identification information of an element of attention (main visual) before the element selection may be registered at the end of history information (e.g., screen history table to be described later).
(Return manipulation) A manipulation to return the display to a visual registered at the end of a history queue. In other words, this manipulation returns the main visual from the current main visual to an immediately previous main visual (main visual displayed previously by one to the current main visual). The visual identification information that is used at the time of returning the visual in response to this manipulation may be deleted from the history information (e.g., screen history table to be described later).
<Meaning of the Level Relation Among Layers>

Visuals are displayed along the aforementioned manipulations, so that the level relation among layers has the following meanings.
It defines a next layer to be seen to a certain layer.
It defines an uppermost layer and a lowermost layer.
For the purpose of analyzing the cause, a task to analyze the cause has an image of "down" as imaged by the word "drill down." In general, in case of layering a computer architecture, as a layer becomes lower like an OSI reference model, it is often described from a point of view closer to a physical layer. It is therefore preferable that the lowest-level layer is a layer closest to a physical layer. It is preferable that the highest-level layer is a layer farthest from the physical layer and is selected when the user wan to confirm the computer system with the most downward view. It is to be noted that while the "REGION/DEPT" layer is substantially the highest-level layer in the embodiment, the "APP" layer may be selected as the highest-level layer.

According to the embodiment, as described above, the "tree-heat map" which is the combination of a heat map and a tree map is used as one example of a visual containing a box with a visually given priority. Since the tree map shows a visual priority with the size of a box (display object), selection of an element in the "go-to manipulation" becomes easier. While a large size of a box brings about a merit of being able to show a greater amount of information in the box, it decreases the number of boxes displayable within a predetermined region (main visual region), so that it may not be essential to change the size of a box according to the worst priority.

While the move-to-lower-level-layer manipulation is the layer movement that permits a layer of attention to be a child layer according to the embodiment, it may be the layer movement that permits a layer of attention to be a layer lower than a child layer. This is because a child element of an element of attention may belong to a layer lower than a child layer of the layer of attention, depending on the topology configuration of the computer system. Likewise, the move-to-higher-level-layer manipulation is the layer movement that permits a layer of attention to be a parent layer according to the embodiment, it may be the layer movement that permits a layer of attention to be a layer higher than a parent layer. This is because a parent element of an element of attention may belong to a layer higher than a parent layer of the layer of attention, depending on the topology configuration of the computer system. The embodiment has been described of the case where all of child elements of an element of attention are contained in a child layer of a layer of attention and all of parent elements of an element of attention are contained in a parent layer of a layer of attention for the sake of descriptive simplification. However, the embodiment may be applied to a case different from such a case. When at least some child elements of a selected element are present in a layer lower than a child layer of a layer containing the selected element, for example, the management server program 541 may not display the box of a child element which is not contained in a child layer on a main visual after the move-to-lower-level-layer manipulation (the box may be excluded from targets to be contained in the main visual). Likewise, when some parent elements of a selected element are present in a layer higher than a parent layer of a layer containing the selected element, the management server program 541 may not display the box of a parent element which is not contained in a parent layer on a main visual after the move-to-higher-level-layer manipulation (the box may be excluded from targets to be contained in the main visual).

The following describes some examples of the management screen that is displayed on the management client 555 referring to FIGS. 9 to 17. At this time, information to be displayed on the individual management screens (information to be displayed in the regions 411, 413, 414 and the like) is based on the management table group 542, for example, tables illustrated in FIGS. 18 to 26, and namely correspond to the topology configuration illustrated in FIG. 8 and the situations of troubles (in which element an error or alert has occurred).

Figure 9:
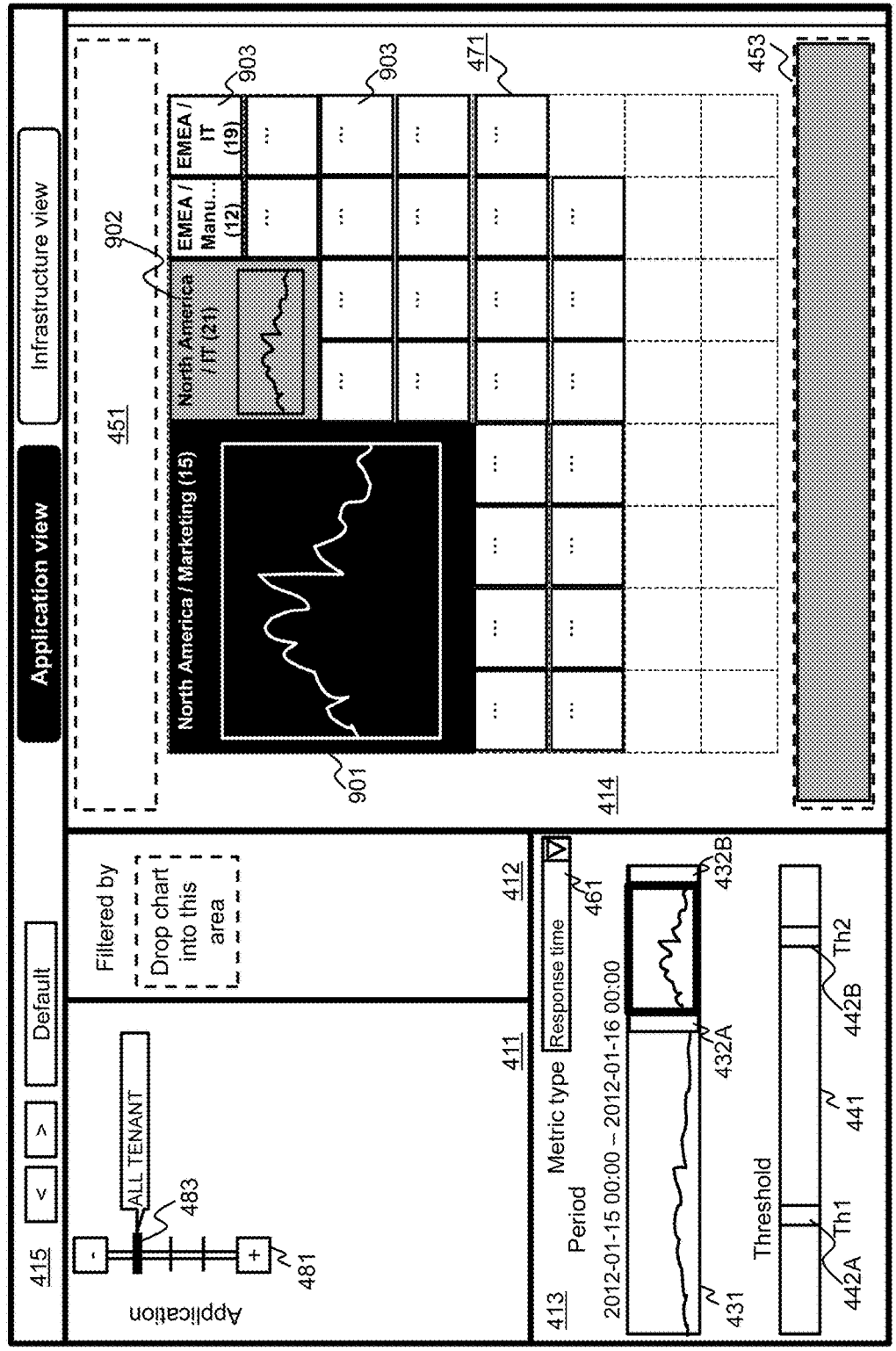
FIG. 9 illustrates one example of an initial management screen.

FIG. 9 illustrates one example of the initial management screen.

The "initial management screen" is a management screen containing a visual where the "ALL TENANT" element (root element) is the element of attention. The "management screen" is a screen which is displayed by the management server program 541 based on the management table group 542.

The management screen has a downward-view display region 411, a highlighting-element designating region 412, a display-condition changing region 413, a visual region 414, and a head region 415.

A layer (layer of attention) to which an element of attention belongs in a plurality of layers of the computer system 100, and the type and name of a higher-level element of the layer of attention are displayed in the downward-view display region 411. Specifically, for example, a plurality of layers respectively correspond to a plurality of scales on a layer bar 481 extending in the heightwise direction. The level relation among the scales correspond to the level relation among layers. Displayed on the left to the layer bar 481 is a display object (e.g., text "Application") indicating that an application hierarchy in the computer system 100 is displayed. A slider 483 is placed over the scales of the layer of attention (layer to which the element of attention belongs) on the layer bar 481, and a display object (text "ALL TENANT" on the initial management screen) specifying the element name of the element of attention is displayed on the scales in association therewith.

An element to be subjected to highlighting is designated in the highlighting-element designating region 412 by a user manipulation. As the user manipulation to designate an element to be subjected to highlighting, drag and drop of the element box of the element from the visual region 414 and into the highlighting-element designating region 412 is adopted according to the embodiment. Another kind of user manipulation such as inputting a text of an element name may be adopted in placed of the former scheme.

A display condition for the visual region 414 is designated in the display-condition changing region 413. A display corresponding to the display condition designated in this region 413 is given on a main visual region 471 of the visual region 414. The types of the display conditions include a display metric type, a display period and a threshold.

The display metric type is a metric type of attention, e.g., a metric type to be reflected on the color and graph of the element box in the visual region 414. The display metric type may be changed using, for example, a pull-down menu 461. Another user manipulation may be adopted as the user manipulation (display-condition changing manipulation) for changing the display metric type.

The display period is a period in which the metric type of attention is measured. When at least one of the start point and end point of the display period is changed, the standardization value of the metric may be changed. This is because the individual worst metrics. It is to be noted that the start point of the display period can be changed by, for example, sliding a start-point object 432A of a display-period bar 431, which extends in the lengthwise direction, in the lengthwise direction, and the end point of the display period can be changed by, for example, sliding an end-point object 432B of the display-period bar 431 in the lengthwise direction. Another user manipulation may be adopted as the user manipulation (display-condition changing manipula-tion) for changing the display period. The length of the width of the display-period bar 431 corresponds to the length of time. Display objects (e.g., texts) indicating the start point of the display period (start time) and the end point of the display period (end time) are displayed above the display-period bar 431.

With regard to the display-condition changing region 413, the thresholds are the threshold 1 and the threshold 2 for the display metric type. The threshold 1 can be changed by sliding a threshold-1 object 442A of a threshold bar 441, which extends in the lengthwise direction, in the lengthwise direction, and the threshold 2 can be changed by sliding a threshold-2 object 442B of the threshold bar 441 in the lengthwise direction. Another user manipulation may be adopted as the user manipulation (display-condition changing manipulation) for changing the threshold 1 and the threshold 2.

The visual region 414 has a main visual display region 471, a parent visual display region 451, and a child visual display region 453. Hereinafter, a visual to be displayed in the main visual display region 471 is sometimes referred to as "main visual," a visual to be displayed in the parent visual display region 451 is sometimes referred to as "parent visual," and a visual to be displayed in the child visual display region 453 is sometimes referred to as "child visual."

The main-visual display region 471 is as described referring to FIGS. 1 and 5. In other words, for example, the main-visual display region 471 is a matrix of 8 rows by 8 columns, and an element box is arranged (drawn) in this region 471. While the matrix is expressed by a broken line in FIGS. 9 to 17 for easier understanding (for enabling visual identification) of the structure of the main visual region, the main visual region actually should not necessarily be displayed visually identifiably.

The size and position of an element box are based on the worst priority of a corresponding element, and the color of the element box is based on the standardization value corresponding to the display metric type for the corresponding element. On the initial management screen, the boxes of child elements of the "ALL TENANT" element are arranged in the main-visual display region 471 according to the rules described referring to FIGS. 1 to 5. Referring to FIG. 9, one example of an element box with a worst priority of "3" (highest) is an element box 901, one example of an element box with a worst priority of "2" is an element box 902, and one example of an element box with a worst priority of "1" (lowest) is an element box 903. For the sake of illustrative convenience, FIG. 9 shows the element names or the like as " . . . " except for the uppermost right box in a plurality of element boxes 903 and the adjacent box to the left of that box. Displayed in each element box are the element name of an element corresponding to the element box (e.g., element name specified from the element table in FIG. 18), the metric graph of the element (graph representing a time-sequential change in metric in the display period for the display metric type) and the number of lower-level elements related to that element (e.g., the number specified from the element table in FIG. 18). The metric graph is created based on an element measurement table in FIG. 19. When the size of the element box is not sufficient to display the element name, the metric graph and the number of lower-level elements, the display of at least one of the element name, the metric graph and the number of lower-level elements is entirely or partially omitted.

The user can immediately specify the existence of the "North America/Marketing" element and the "North America/IT" element as elements in trouble (e.g., error or alerted elements) from the positions, sizes and colors of the element boxes in the main visual in FIG. 9.

The user can perform "move-to-lower-level-layer manipulation" for a desired element box in the main visual. This permits the user to visually identify a child element of an element corresponding to the element box. Further, adequately repeating the manipulation can sequentially shift a layer of attention lower so that elements related to an element in trouble to which attention has been drawn (which is the origin), and located lower than the element in trouble (e.g., particularly, element which appears to be the cause for the trouble) can be found.

In addition, the user can perform "move-to-higher-level-layer manipulation" for a desired element box in the main visual. This permits the user to visually identify a parent element of an element corresponding to the element box. Further, adequately repeating the manipulation can sequentially shift a layer of attention higher so that elements related to an element in trouble to which attention has been drawn (which is the origin), and located higher than the element in trouble (e.g., particularly, element which appears to be influenced by the trouble) can be found.

A parent visual is displayed in the parent visual display region 451. The "parent visual" is a set of one or more element boxes contained in the main visual immediately previous to the main visual of attention (current main visual), and the immediately-previous main visual is a visual corresponding to an element belonging to a parent layer of the current layer of attention. When the move-to-lower-level-layer manipulation is performed, therefore, element boxes in the main visual that has been displayed before this manipulation are displayed in the parent visual display region 451. It is to be noted that the parent visual display region 451 being blank means that no parent elements are present in the element of attention. When the move-to-higher-level-layer manipulation, not the move-to-lower-level-layer manipulation, is possible, a predetermined parent visual (e.g., parent visual whose entire area is filled in gray) is displayed in the parent visual display region 451.

A child visual is displayed in the child visual display region 453. The "child visual" is a set of one or more element boxes contained in the main visual immediately previous to the current main visual, and the immediately-previous main visual is a visual corresponding to an element belonging to a child layer of the current layer of attention. When the move-to-higher-level-layer manipulation is performed, therefore, element boxes in the main visual that has been displayed before this manipulation are displayed in the child visual display region 453. It is to be noted that the child visual display region 453 being blank means that no child elements are present in the element of attention. When the move-to-lower-level-layer manipulation, not the move-to-higher-level-layer manipulation, is possible, a predetermined child visual (e.g., child visual whose entire area is filled in gray) as illustrated in FIG. 9 is displayed in the child visual display region 453.

As described above, when the "go-to manipulation" is performed, element boxes contained in a visual displayed as the main visual before the manipulation are displayed in each of the regions 451 and 453. This raises at least one of expectations that it is easier to visually identify the display in the hierarchical structure and it is easier to identify for which layer's visual the "go-to manipulation" has been performed to result in the display of the current main visual.

A return button "<," a forward button ">," a default button "Default" and a display hierarchical type object are displayed in the head region 415. When the return button "<" is designated (e.g., clicked or tapped), the display of the management screen returns based on the display transition history of the management screen (e.g., screen history table to be described later), and when the forward button ">" is designated, the display of the management screen advances based on the display transition history of the management screen (e.g., screen history table to be described later). (The details will be given later.) When the default button "Default" is designated, the display of the management screen becomes the display of the initial management screen. The display hierarchical type object represents the type of the hierarchy to which the layer of attention belongs. For example, the display hierarchical type object is formed by a text "Application view" and a text "Infrastructure view"; the text "Application view" is highlighted (reverse-displayed in the example of FIG. 9) when the layer of attention is a layer in the application hierarchy and the text "Infrastructure view" is highlighted when the layer of attention is a layer in the infrastructure hierarchy.

The above is the description of the structure of the management screen, and the description of the initial management screen. The following describes some examples of user manipulations on the management screens, and the management screens after execution of the user manipulations.

<Move-to-Lower-Level-Layer Manipulation>

When the user selects a desired element (box) in the main visual (by placing the mouse cursor over it, for example), and performs the "move-to-lower-level-layer manipulation," the main visual is changed to a main visual having the selected element as an element of attention. In other words, the boxes of child elements of the selected element are displayed in the main visual region. When the user selects the element "North America/Marketing" on the initial management screen in FIG. 9 and performs the "move-to-lower-level-layer manipulation," the display of the management screen is changed to a display in FIG. 10. In other words, the management server program 541 performs the following display alteration.

(10-1) The display of the downward-view display region 411 is changed. Specifically, the slider 483 moves one scale downward, and the element name, "North America/Marketing," of the selected element is displayed on the scale in association therewith. For the layer before the shifting, the element name, "ALL TENANT," remains. This makes it apparent that the user has selected "North America/Marketing," one of child elements of "ALL TENANT."

Figure 10:
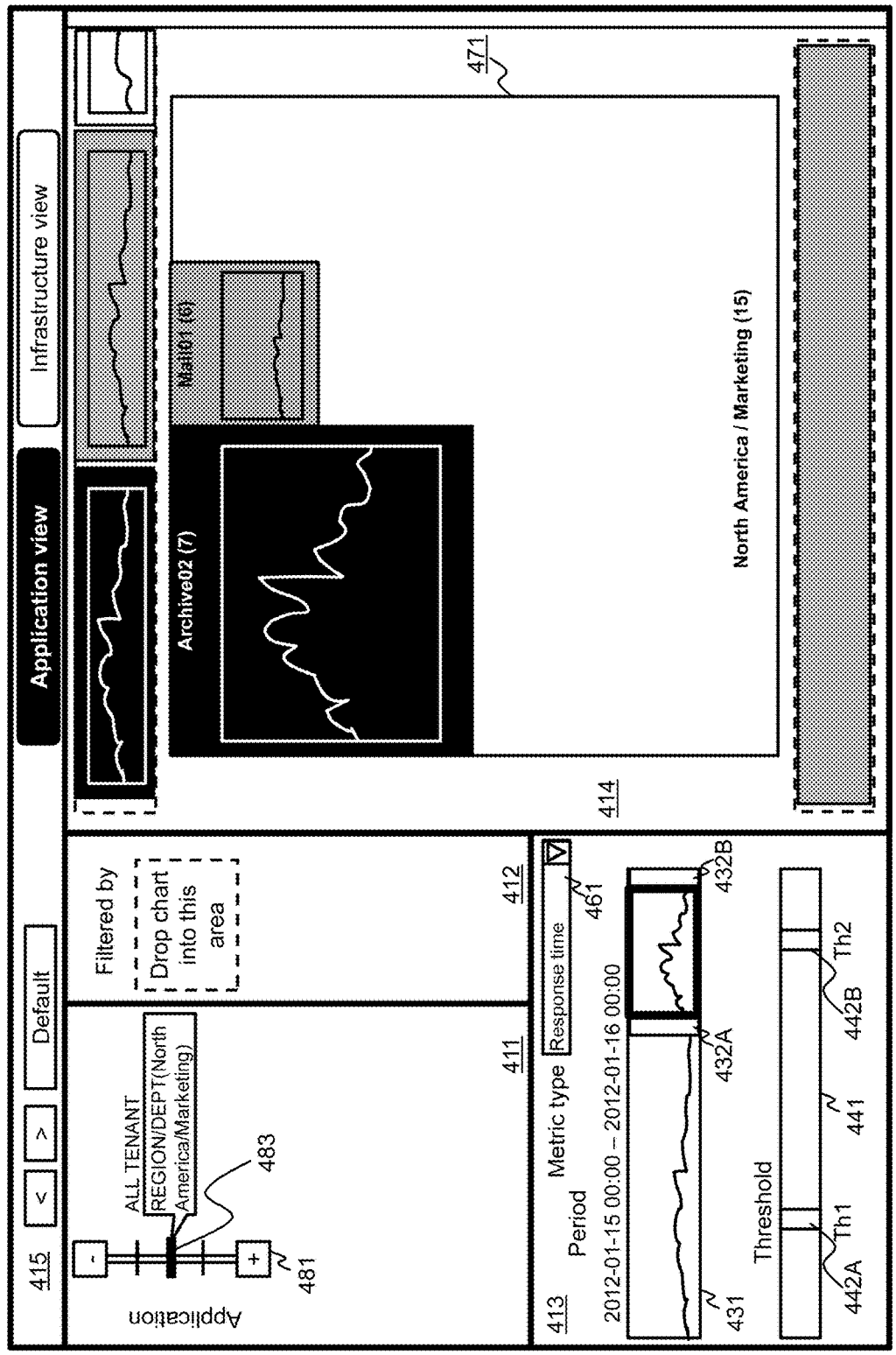
FIG. 10 illustrates one example of a management screen which is displayed when a move-to-lower-level-layer manipulation is performed on the screen in FIG. 9.
Figure 11:
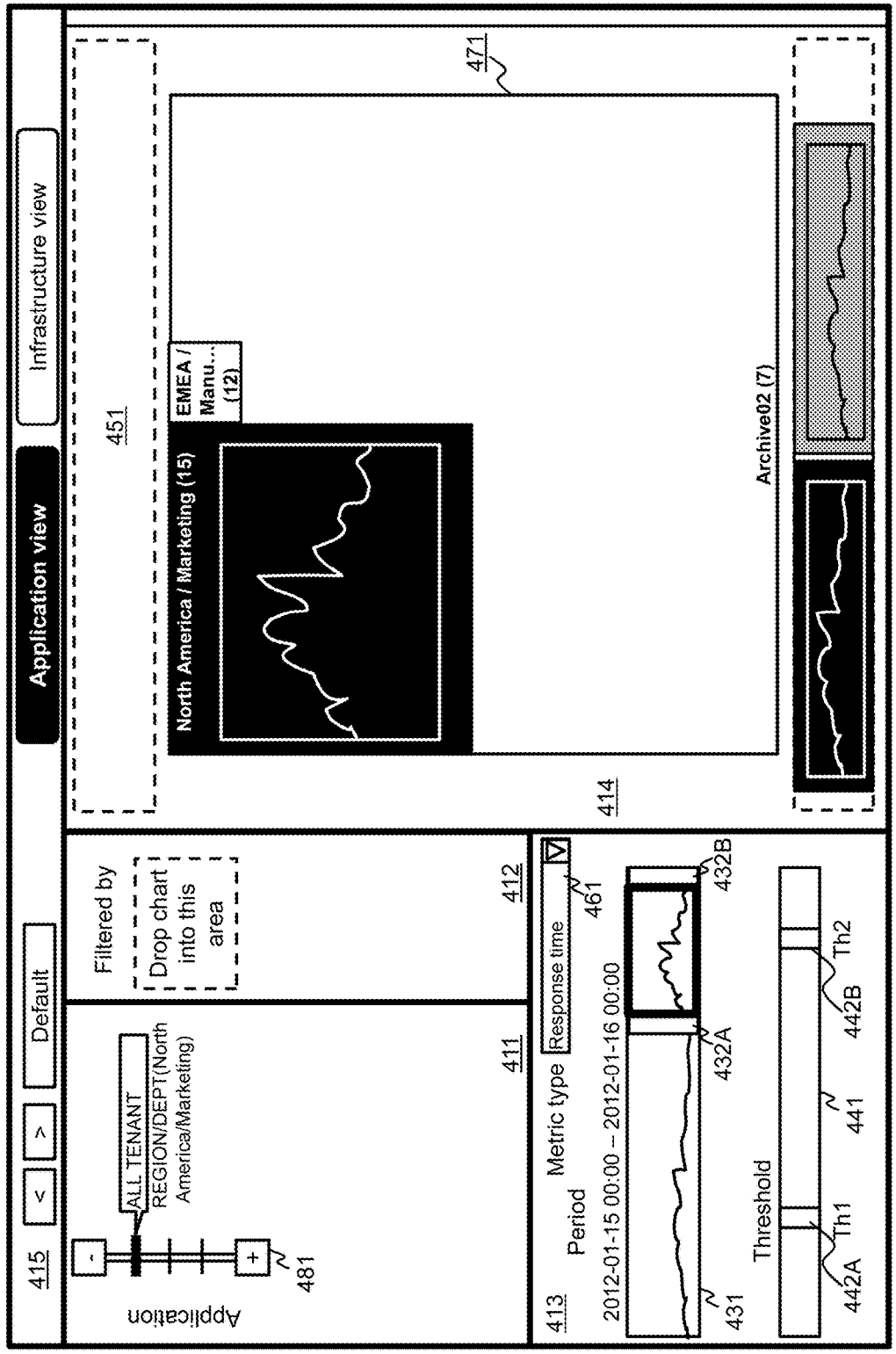
FIG. 11 illustrates one example of a management screen which is displayed when a move-to-higher-level-layer manipulation is performed on the screen in FIG. 10.

(10-2) The display of the main visual is changed. Specifically, the management server program 541 erases boxes other than the box of the selected element "North America/Marketing" enlarges the selected element, and displays the boxes of child elements, "Archive02" and "Mail01," of the selected element "North America/Marketing" in the enlarged box. The size of the selected element after enlargement may be equal to or larger than the size necessary to display the boxes of all the child elements, and may be, for example, the same size as the main visual region 471 as in the example of FIG. 10. The selected box is enlarged by, for example, animation to a size equal to or larger than the size necessary to display the boxes of all the child elements, namely the size to cover the display region of the main visual after the move-to-lower-level-layer manipulation. Accordingly, the user easily identifies what is selected to display a main visual after the move-to-lower-level-layer manipulation. The enlarging animation is the motion that gives intuitive understanding that the main visual after the move-to-lower-level-layer manipulation is the concrete form of the selected element. The color (background color) of the enlarged selected box may be a predetermined color (e.g., white as shown in FIG. 10) from the viewpoint of easy viewing, or may remain as the original color of the box before the enlargement. Further, the selected box itself may be erased in addition to boxes excluding the selected box, and boxes of child elements of the selected element may be displayed in the main visual region 471. Since the element name of the selected element is displayed in the downward-view display region 411, even without the enlargement of the selected box (even when the selected box is erased) the user sees to which element the element displayed in the main visual region 471 is related. In addition, the size and position of each of the child elements "Archive02" and "Mail01" are based on the corresponding worst priority, and the color of the box of each child element is based on the corresponding standardization value (standardization value corresponding to the display metric type), as described above. This is what has already been described above.

(10-3) A parent visual is displayed in the parent visual display region 451. This is because the layer of attention shifts to a child layer, and the main visual immediately before the layer movement is the visual of a parent layer (parent element). The parent visual includes an element box contained in the main visual in FIG. 9. It is to be noted that the display of at least one of the element name, the metric graph and the number of lower-level elements may be entirely or partially omitted in an element box within the parent visual.

(10-4) Since a child element is present in at least one of the child elements "Archive02" and "Mail01," the display of a predetermined child visual on the child visual display region 453 is maintained.

<Move-to-Higher-Level-Layer Manipulation>

When the user selects a desired element box in the main visual (by placing the mouse cursor over it, for example), and performs the "move-to-higher-level-layer manipulation," the main visual is changed to a main visual containing a parent element of the selected element. When the user selects the element box "Archive02" on the management screen in FIG. 10 and performs the "move-to-higher-level-layer manipulation," the display of the management screen is changed to a display in FIG. 11. In other words, the management server program 541 performs the following display alteration.

(11-1) The display of the downward-view display region 411 is changed. Specifically, the slider 483 moves one scale upward, and the element type of the currently displayed layer and the element name "Archive02" in parentheses of the element designated are displayed. When there are a plurality of elements designated, for example, the elements are displayed with commas to separate them. When the number of characters to be displayed becomes large, characters equal to or less than the displayable upper limit are omitted with " . . . ".

(11-2) The display of the main visual is changed. Specifically, the management server program 541 erases all the element boxes, and displays the boxes of the individual parent elements "North America/Marketing" and "EMEA/Manufacturing" of the selected element. In other words, in comparison with the management screen in FIG. 9, only the parent elements "North America/Marketing" and "EMEA/Manufacturing" of the selected element "Archive02" among the child elements of "ALL TENANT" are displayed in the main visual region 471. In case of movement to a parent layer, the main visual of the layer of attention may be reduced (e.g., reduced by animation), and the box of an element may be displayed in the main visual of the parent layer. Further, the size and position of each of the box of each of the parent elements "North America/Marketing" and "EMEA/Manufacturing" are based on the corresponding worst priority, and the color of the box of each parent element is based on the corresponding standardization value (standardization value corresponding to the display metric type).

(11-3) A parent visual is erased from the parent visual display region 451. This is because the layer of attention shifts to a parent layer, and the parent element of either one of the elements "North America/Marketing" and "EMEA/Manufacturing" is the highest-level element "ALL TENANT" (because no further move-to-higher-level-layer manipulation is possible).

(11-4) A child visual in the child visual display region 453 is changed from a predetermined child visual to a child visual containing an element box. This is because the layer of attention has shifted to a parent layer, and the main visual immediately before the layer movement is the visual of a child layer. A child visual contains an element box which is contained in the main visual region comprising in FIG. 10. It is to be noted that the display of at least one of the element name, the metric graph and the number of lower-level elements may be entirely or partially omitted in an element box within the child visual.

<Return Manipulation>

When the user performs the "return manipulation" (e.g., clicks or taps the return button "<") on the management screen, the management screen returns to the one displayed immediately before from the current management screen. When the return button "<" on the management screen in FIG. 10 is pressed, for example, the management screen is set back to the management screen illustrated in FIG. 9 from the management screen illustrated in FIG. 10 by the management server program 541.

<Display-Condition Changing Manipulation>

The user can perform the display-condition changing manipulation on the management screen (e.g., management screen showing a main visual with a desired element set as an element of attention). One example of the display-condition changing manipulation is a manipulation to change the display metric type. When the manipulation to change the display metric type is performed, the color of each element box in main visual is changed to a color according to the standardization value corresponding to the changed display metric type. As the user changes the display of the pull-down menu 461 from "Response time" to "Number of alert" (the number of alert events) on the initial management screen in FIG. 9, for example, the management server program 541 performs the following display alteration.

Figure 12:
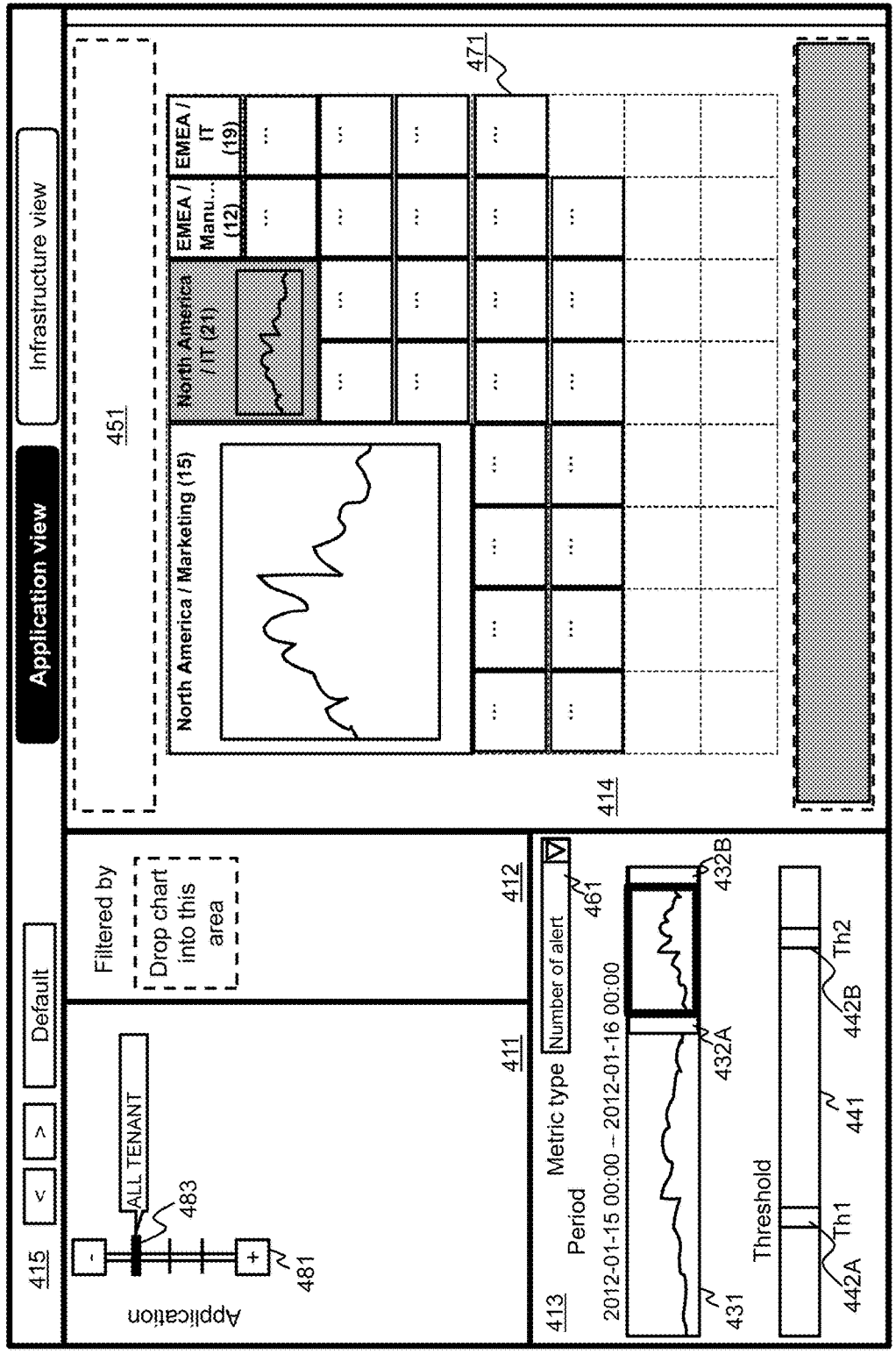
FIG. 12 illustrates one example of a management screen which is displayed when a display-condition changing manipulation is performed on the screen in FIG. 9.

In other words, the main visual is changed. FIG. 12 illustrates one example of the management screen containing the changed main visual. Specifically, the management server program 541 specifies the worst standardization value in the display period in correspondence to the changed display metric type from the management table group 542 (table in FIG. 19), and, when the color of an element box differs from the color according to the specified standardization value, changes the color of the element box to the color according to the specified standardization value. At this time, the management server program 541 does not change the position and size of each element box. This is because even when changing the display element changes the corresponding standardization value, the display period is not changed, so that the worst priority of each element does not change.

When not only the display metric type but also another type of display condition (at least one of the display period and the threshold) is changed, a main visual is redrawn according to the changed display condition. Even when the display condition is changed, however, at least one of a parent visual and a child visual may not be redrawn. Alternatively, when the changed display condition is a display metric type (display condition that affects the color of an element box), both of a parent visual and a child visual may be redrawn. When the "go-to manipulation" is performed after at least one of the display conditions, the display metric type, the display condition or the threshold, is changed, at least the display metric type and the display condition in the display metric type, the display condition and the threshold may be turned over to the management screen after the manipulation. The threshold may also be turned over to the management screen after the manipulation.

A change in the display condition such as the display metric type should be reflected on the display of at least one element box (which may be all of or some of the element boxes) contained in the main visual.

<Element Highlighting Manipulation>

When the user performs a highlighting manipulation on a desired element box in the main visual of an element of attention, even if the element of attention (layer of attention) is changed to whichever element (layer), the management server program 541 displays a highlighting object (display object representing a highlighting element) in the box of an element related to an element to be subjected to the highlighting manipulation (hereinafter, highlighting element) in element boxes in the changed main visual. The following describes one example of the manipulation referring to FIGS. 13 and 14. It is to be noted that the "element related to a highlighting element" may be a parent element or a child element of the highlighting element, or may be an element related to the highlighting element with one or more elements in between.

Figure 13:
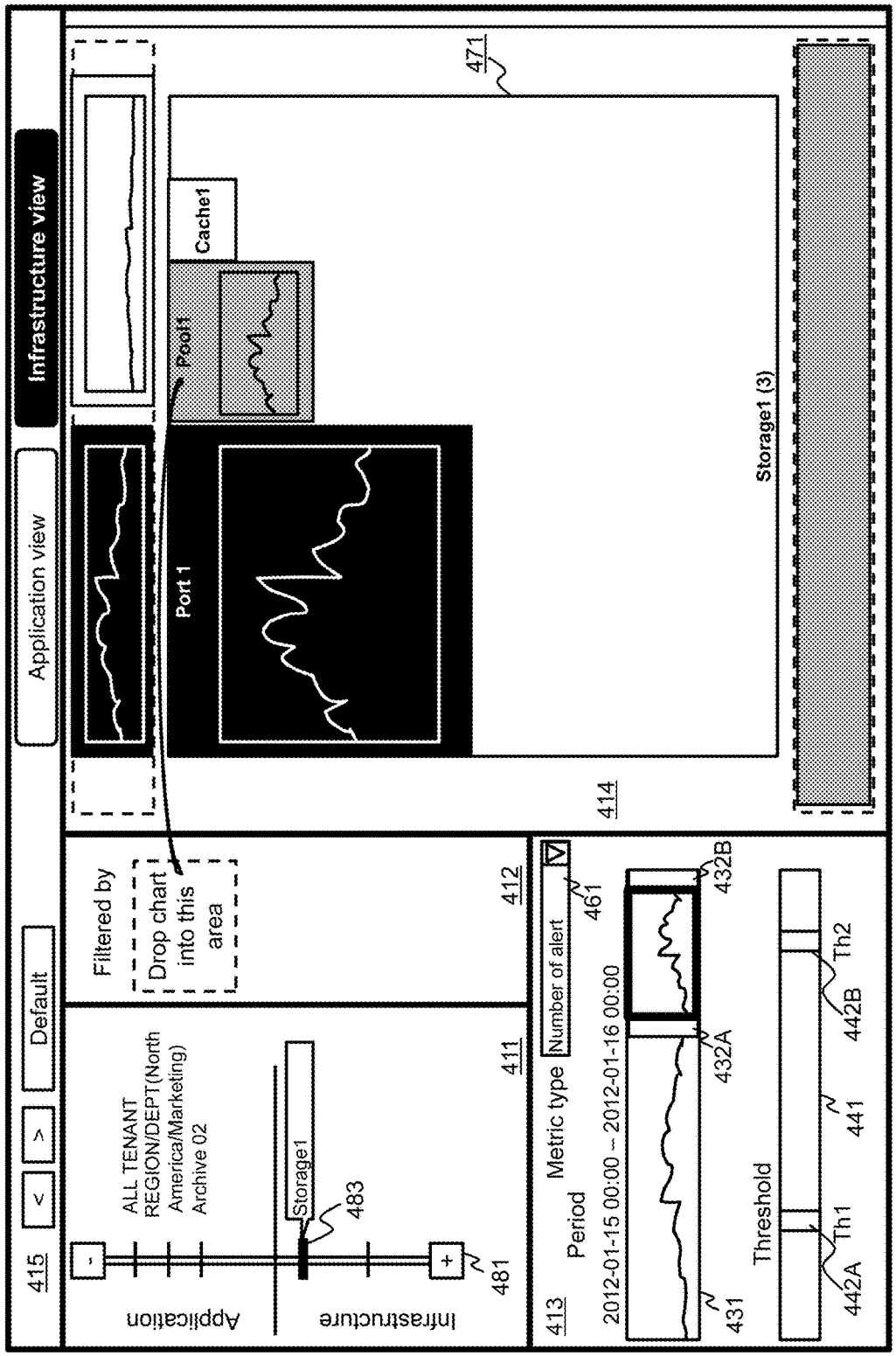
FIG. 13 is an explanatory diagram of one example of an element highlighting manipulation.
Figure 14:
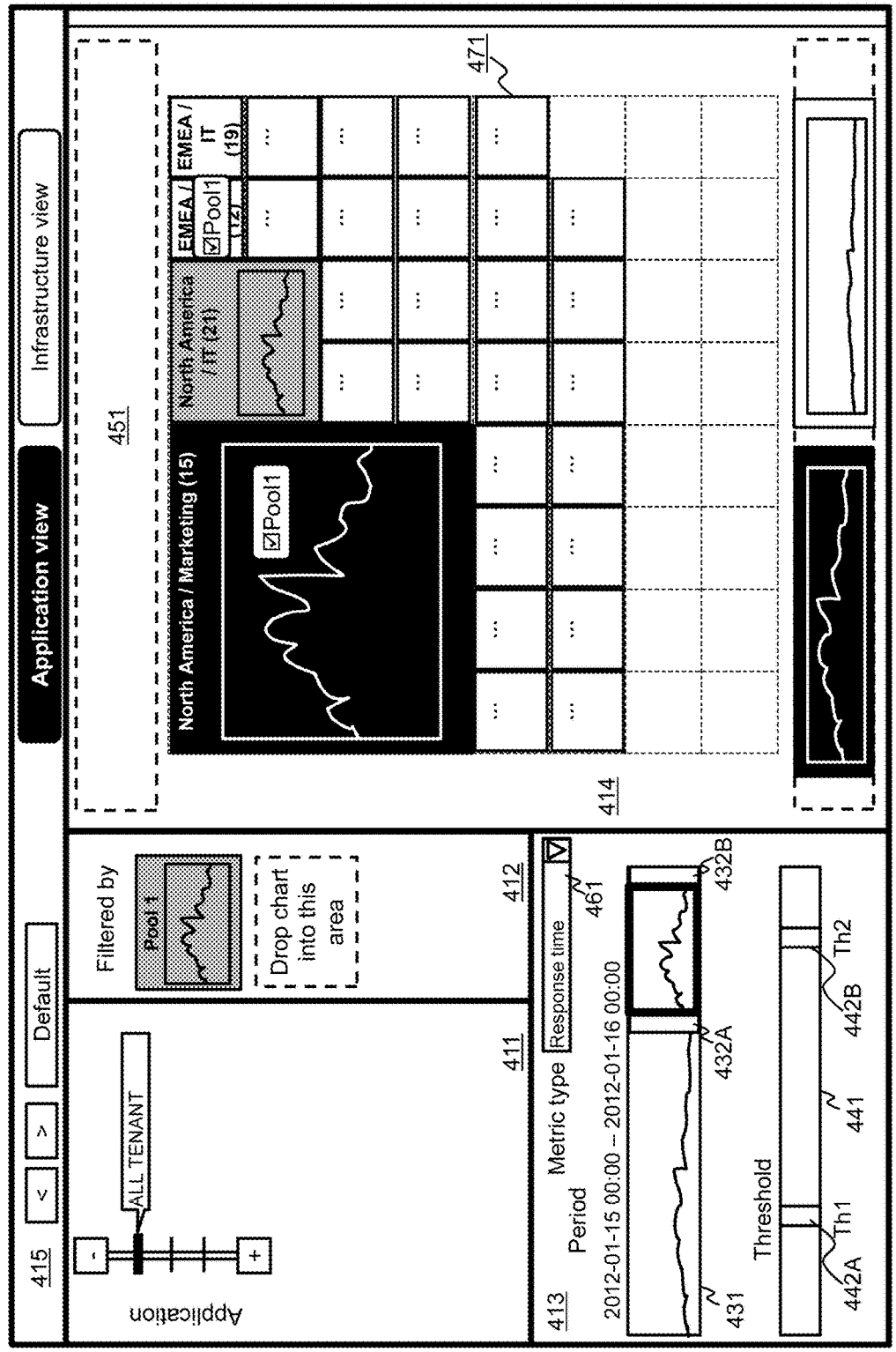
FIG. 14 illustrates one example of a management screen after the element highlighting manipulation.

FIG. 13 illustrates one example of the management screen after the move-to-lower-level-layer manipulation is performed plural times from the initial management screen. In the example of FIG. 13, the element of attention is "Storage1." The element "Storage1" belongs to the infrastructure hierarchy (see FIG. 8). Therefore, an object representing that attention is given to an element belonging to the infrastructure hierarchy (e.g., text "Infrastructure") is displayed to the left of the layer bar 481 in the downward-view display region 411.

The main visual contains child elements "Port1," "Pool1" and "Cache1" of the element of attention "Storage1". Suppose that the user has copied (dragged and dropped) the element box "Pool1" from the main visual region 471 into the highlighting-element designating region 412. This manipulation is one example of the highlighting manipulation on the element box "Pool1."

When the main visual is changed thereafter due to a change of the element of attention, a highlighting object representing the highlighting element "Pool1" is displayed on the box of an element related to the highlighting element "Pool1" in the main visual after the change. Specifically, it is assumed that, for example, after the box "Pool1" is dragged and dropped into the highlighting-element designating region 412, a user manipulation, such as pressing the "Default" button, has changed the management screen to the initial management screen. In this case, as exemplified in FIG. 14, the management server program 541 displays the highlighting object "Pool1" on the box of the element related to the highlighting element "Pool1" in the main visual. Accordingly, the user can grasp the element related to the highlighting element "Pool1" even if attention is paid to whichever element (layer) after the highlighting manipulation.

The highlighting object contains a check box, so that when a check mark is set off from the check box by a user manipulation, the highlighting object with the check mark set off may be erased by the management server program 541.

Deletion of the highlighting element box "Pool1" from the highlighting-element designating region 412 (canceling the setting of the element "Pool1" to a highlighting element) erases all the highlighting objects corresponding to the highlighting element "Pool1" from the main visual, after which even if attention is paid to whichever element (layer), the highlighting object corresponding to the element "Pool1" is not displayed.

One or more element boxes can be copied into the highlighting-element designating region 412, and a highlighting object can be displayed for each element copied into the highlighting-element designating region 412. If any box in the main visual is related to a plurality of highlighting elements, a plurality of highlighting objects corresponding to the plurality of highlighting elements are displayed on that box. When the number of highlighting objects exceeds a predetermined number for a single element box (e.g., when the number of highlighting objects is large for the size of the element box), the management server program 541 may omit the display of at least one highlighting object, and display the number of highlighting objects.

In addition, a box related to a highlighting element (box over which the highlighting object is to be placed) itself may be highlighted (e.g., the display mode of at least one of the thickness and color of the frame border of the box may be changed).

Because this element highlighting can permit grasping of the relation of an element which is separated from the highlighting element by one or more elements, and grasping of the relation independently of the grasping of the relation through the subsequent movement manipulation or return manipulation, thus ensuring visual identification in the original movement manipulation or return manipulation while checking the relation from the highlighting element whose relation is desirably grasped secondarily.

<Marking Manipulation>

The user can perform a marking manipulation on any element box in the main visual of the element of attention. The marking manipulation is to designate the time to associate a mark with a desired time. The designated time is referred to as "marking time." For example, the marking manipulation is to designate (e.g., click or tap) a desired place in a graph in an element box, and the management server program 541 receives the marking manipulation and displays a mark at the designated place in response to the manipulation. Thereafter, even when main visual is changed by the alternation of the mark, the mark is transmitted to the changed main visual. In other words, regardless of the display of the main visual of whichever element (layer), a mark is displayed on the graph. The coordinates of the mark to be displayed on the graph (coordinates on the graph in the element box) are (T, Y) in whichever graph. T is the marking time (time corresponding to the place designated by the user). Y is the metric corresponding to the marking time.

Therefore, while T is the same on a plurality of graphs, Y may vary. This is because the metric varies according to elements.

Figure 15:
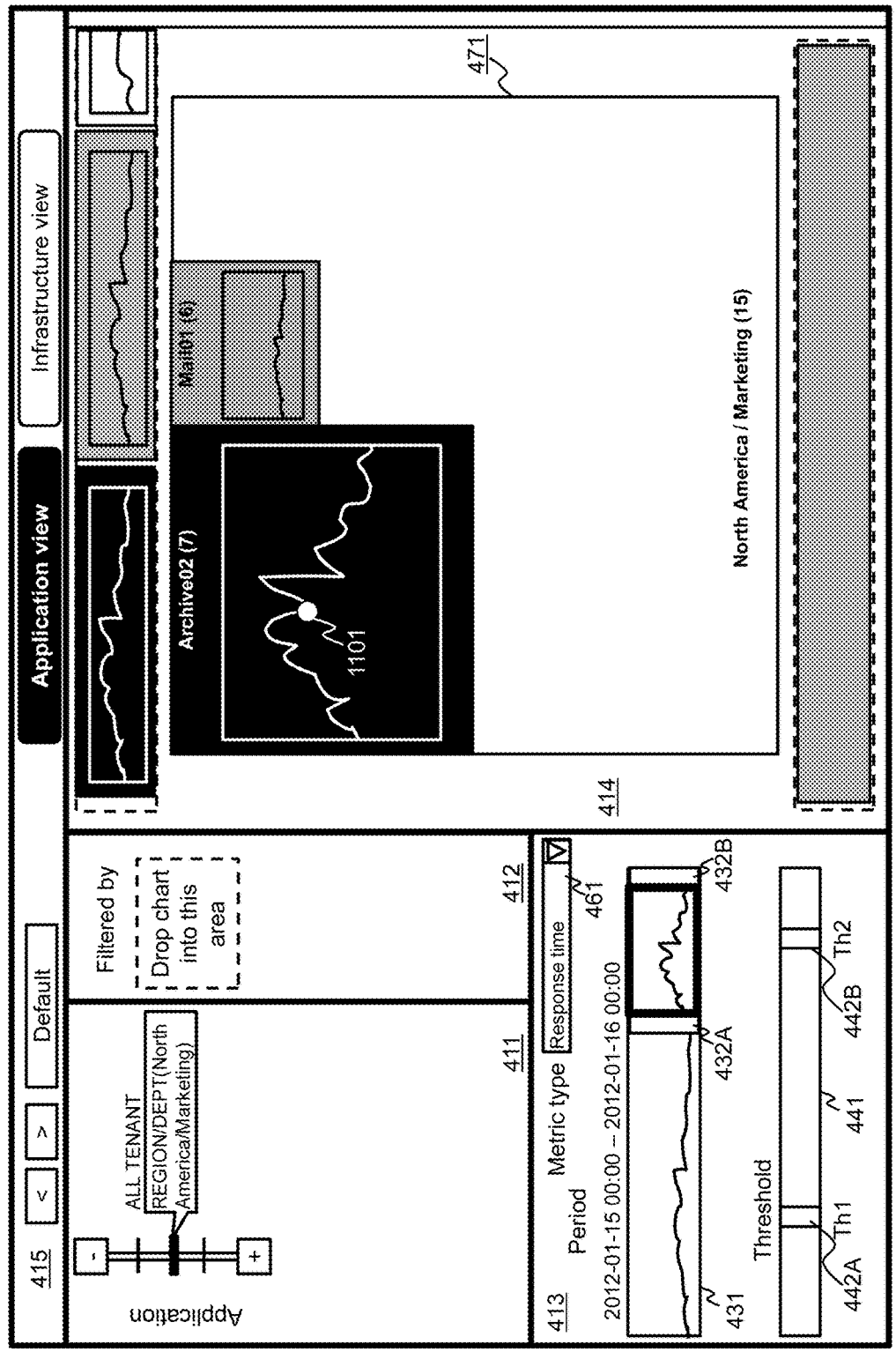
FIG. 15 illustrates one example of a management screen after a marking manipulation.
Figure 16:
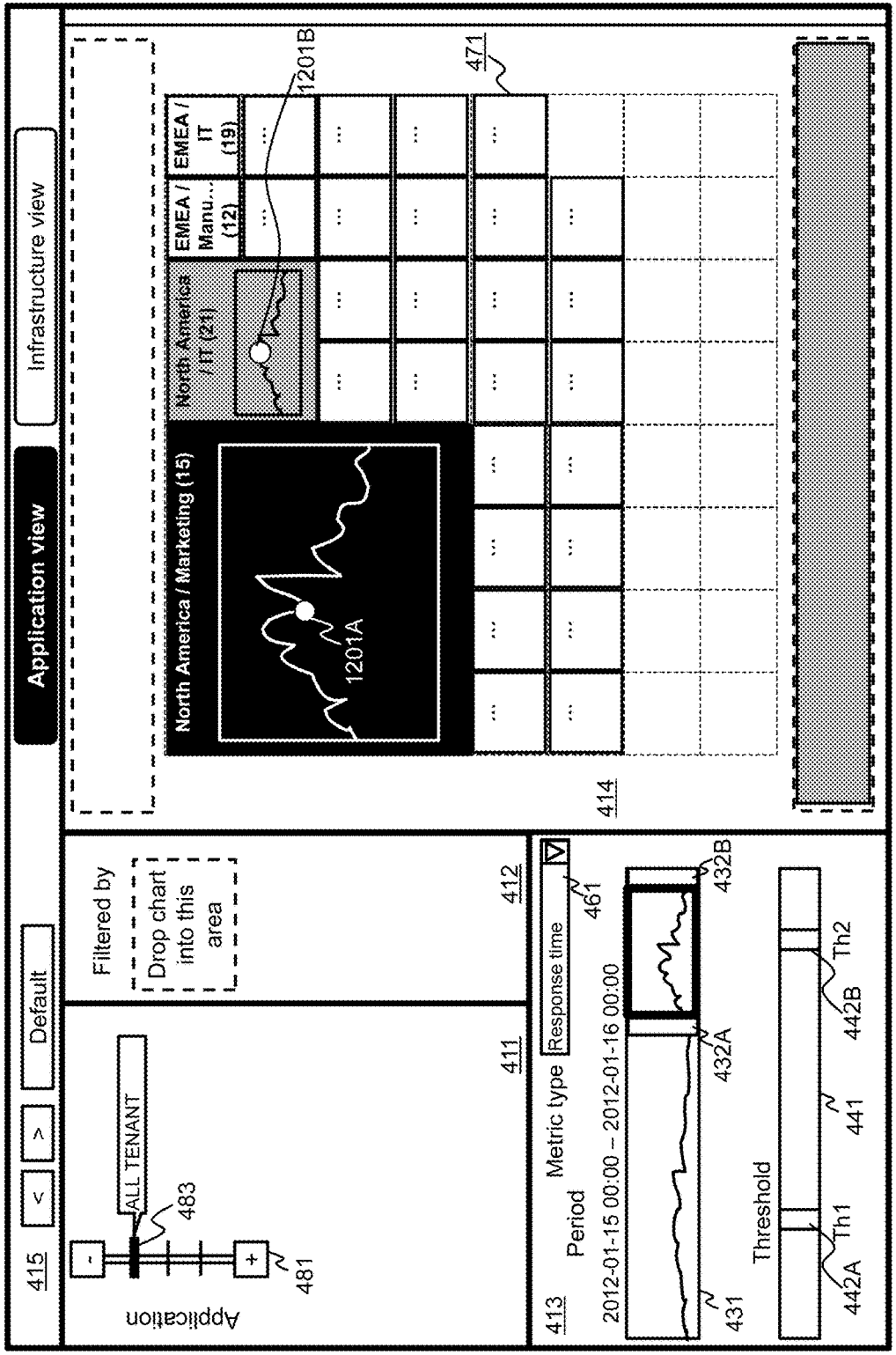
FIG. 16 illustrates one example of another management screen after the marking manipulation.

FIG. 15 illustrates one example of the result of the marking manipulation on the management screen illustrated in FIG. 9. In the example of FIG. 15, the user performs the marking manipulation on the box of the element "Archive02" to thereby display a mark 1101A on the corresponding coordinates (T, Y) on the graph in the "Archive02" box. A mark 1101B may be put on the corresponding coordinates (T, Y) on the graph in another box "Mail01."

Suppose that the display of the management screen is changed to the display of the initial management screen thereafter. In this case, as exemplified in FIG. 16, marks 1201A and 1202B are displayed at the corresponding coordinates (T, Y) on each graph in the main visual (on the respective graphs of the boxes "North America/Marketing" and "North America/IT" where the graphs are displayed).

The user can delete the mark on either one of the graphs (mark displayed through the marking manipulation) from that graph. In this case, the management server program 541 can delete all marks at the same marking time as the marking time corresponding to the deleted mark.

<Display-Priority Changing Manipulation>

The display-priority changing manipulation is to allow the user to manually change the display priority. For example, the management screen in FIG. 17 is one example of the management screen after the display-priority changing manipulation.

That is, before the display-priority changing manipulation, "Server3" and "Storage2" are the elements arranged in the high-to-low order of the display priority. This is because while those elements have the same worst priority, the element "Server3" has a younger element ID (see FIG. 18).

Figure 17:
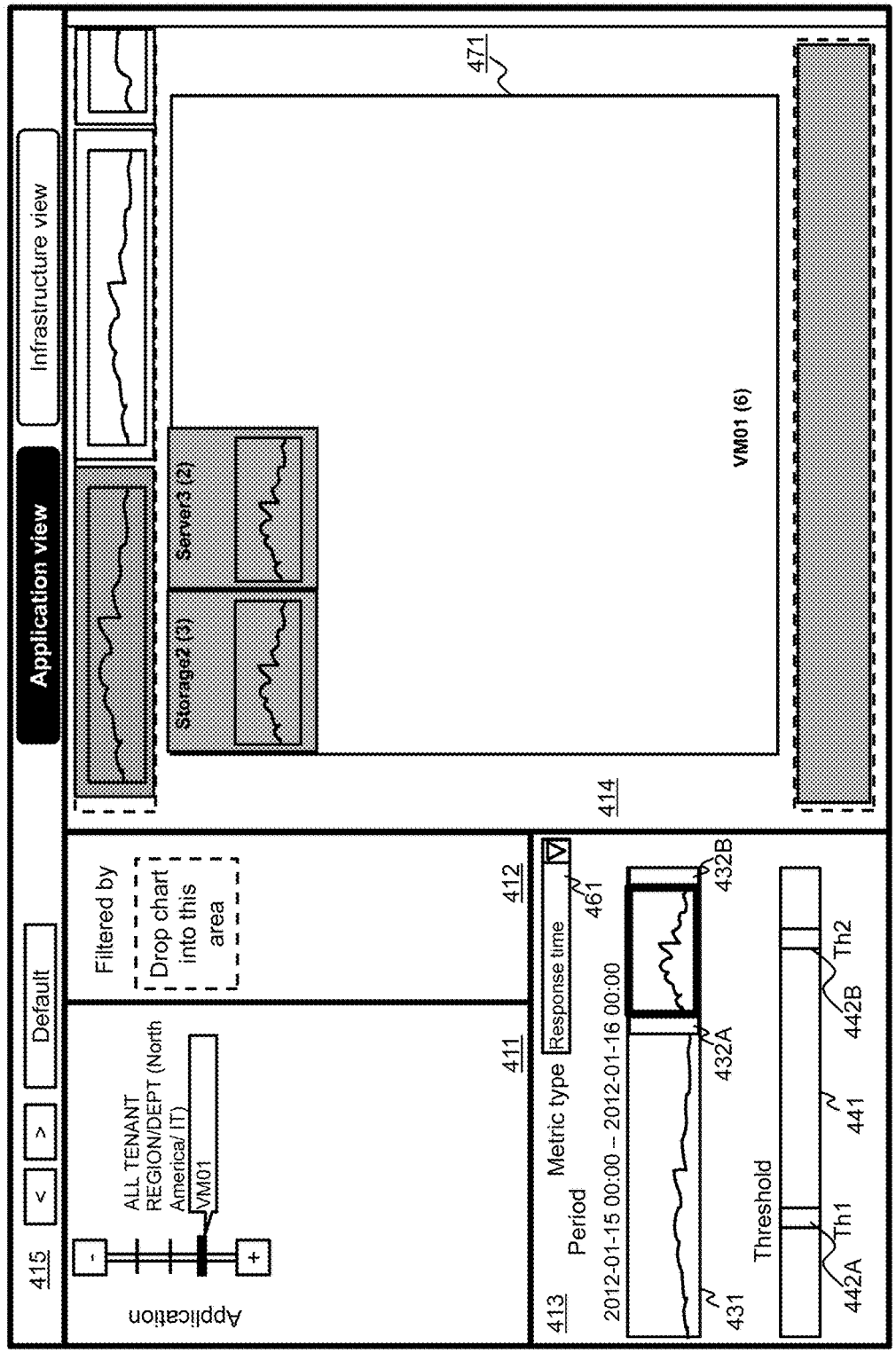
FIG. 17 illustrates one example of a management screen after a display-priority changing manipulation.

However, the display-priority changing manipulation sets the display priority of the element "Storage2" higher than that of the element "Server3," making the display of the main visual as illustrated in FIG. 17.

In the display-priority changing manipulation, for example, a determination method after alteration of the display priority (e.g., switching of the descending/ascending order of element names, designation of a metric to be referred to determine the display priority, or the like) may be designated. The display priority which is changed by the management server program 541 according to the determination method may be registered in any one of the tables in the management table group 542.

The above is one example of some user manipulations and the displays of the management screens originating from the manipulations.

<About Manipulations>

When analysis of the cause is the principal objective, it is expected that the execution frequency of the move-to-lower-level-layer manipulation, the return manipulation and the display-metric-type changing manipulation increases. It is therefore preferable that a user action as a manipulation should be simple and intuitive for each of those three manipulations. From this point of view, it is expected to assign a simpler user action to each of the three manipulations.

However, achieving intuitive user actions requires matching among the individual user actions. Particularly, the "move-to-higher-level-layer manipulation" whose execution frequency is low means the same as the move-to-lower-level-layer manipulation with a different direction. It is also necessary to consider the historical details of the fact that the "return" manipulation which has been carried out in other applications have been achieved (because it is unnecessary to designate an element in the "return" manipulation).

FIG. 34 illustrates the outline of specific examples of user actions in view of the above. This system of user actions have the following characteristics.

User actions in the move-to-higher-level-layer manipulation and the move-to-lower-level-layer manipulation make good use of the images of "up" and "down" to designate the direction of movement with a wheel or the swiping direction. It is to be noted however that since the execution frequency of the move-to-lower-level-layer manipulation higher as mentioned above, the simplest manipulation of "clicking/tapping a subject" is in compliance with the move-to-lower-level-layer manipulation. Although "clicking/tapping a subject" is one example of a manipulation to select a desired element, either one of the move-to-higher-level-layer manipulation and the move-to-higher-level-layer manipulation may not include the selection manipulation.

Because of two points, namely the old history and unnecessity to select an element, the "return" manipulation whose execution frequency is high is a button-based manipulation. In case of a touch panel, which does not involve the movement of a mouse cursor, the "return" manipulation is simple, whereas in case of the environment where a mouse is used, the movement of a mouse cursor is involved, so that the "return" manipulation is not simple compared to the movement to lower-level-layer. As a measure against the problem, right click+menu or assignment of a keyboard shortcut enables the "return manipulation" quickly.

Because vertical swiping is assigned to the layer movement manipulation ("go-to manipulation"), horizontal swiping or an action to press a right/left cursor is associated with a "display-metric-type changing" which has a high execution frequency. In other words, although the manipulation of the pull-down menu is one example of the display-metric-type changing manipulation is an action to perform horizontal swiping or depress the right/left cursor in the example of FIG. 34. Accordingly, a manipulation which has high execution frequency in the touch-panel environment can be achieved by vertical and horizontal swiping. While cursor movement is involved in the environment under which both the mouse and keyboard are used, single clicking, single wheel rotation and single key depression are possible.

To change the display metric type with horizontal swiping, the management system (management server program) should be able to specify a metric type to be displayed after swiping. Therefore, the management system may hold information representing the metric type display order for each element type or for each layer, or may hold such a display order with program embedding.

<Initial Screen for Infrastructure Manager>

The management screens which have been described above are favorable for a manager whose main work is to manage the application hierarchy. However, there may be an infrastructure hierarchy manager as a manage. Further, the application hierarchy manager may work as the infrastructure hierarchy manager too. In this respect, a display mode having the following features (referred to as infrastructure hierarchy mode) may be provided for the infrastructure hierarchy manager. The display mode which has been described so far may be called "application hierarchy mode."

The initial management screen has the highest-level layer in the infrastructure hierarchy, namely the "APPARATUS" layer (narrowing down for the selected element may be unnecessary) set as the highest-level layer.

The management system may switch between those modes (application hierarchy mode and infrastructure hierarchy mode) according to a user manipulation. This can permit the manager to carry out analysis on an adequate screen depending on his or her own role. The mode after being switched may be registered in any one of the tables in the management table group 542, so that at the time of displaying the initial management screen, the initial management screen according to the specified mode may be generated. In other words, when the specified mode is the application hierarchy mode, the management system may generate the initial management screen as illustrated in FIG. 9, whereas when the specified mode is the infrastructure hierarchy mode, the management system may generate the initial management screen where the highest-level element is the highest-level element of the infrastructure hierarchy.

There is a case where a virtual machine is construed to be included in the infrastructure hierarchy. In such a case, a virtual machine layer is provided at a level lower than the "application" layer but higher than the "APPARATUS" layer, so that the virtual machine layer may be set as the highest-level element of the infrastructure hierarchy, and may be displayed as the initial management screen of the infrastructure hierarchy mode. While switching to each hierarchy mode may be achieved by pressing an "Application View" button or an "Infrastructure View" button, another switching manipulation may be adopted.

<Substitution of Parent Visual or Child Visual>

The screens presented so far provide the display of a parent or child visual that makes it easy to identify that the main visual is originated from the manipulation of which layer's visual. However, another expression may be employed as a display to prompt such identification. For example, the main visual before the move-to-lower-level-layer manipulation may be enlarged about the selected box, and the main visual (main visual in FIG. 10) after the move-to-lower-level-layer manipulation may be embedded (displayed) in the enlarged box.

The following describes some examples of the tables contained in the management table group 542.

FIG. 18 illustrates one example of an element table.

An element table 1800 represents a relation (topology configuration) between elements. For example, the element table 1800 includes an element ID, an element name, an element type, a parent element ID, a child element ID, a measurement ID and a worst priority for each element. This table 1800 represents the topology configuration exemplified in FIG. 8. The worst priority is the priority that is calculated by the management server program 541 based on the current display condition. The worst priority is calculated and updated when the display condition is changed. The method of calculating the worst priority may be the one described referring to FIGS. 1 to 5.

If the relation among elements is known, the table structure is not limited to the one illustrated in FIG. 18. It is to be noted that the parent-child relation can be said to be information obtained by organizing the relation among elements referring to a layer definition table to be described later.

FIG. 19 illustrates one example of an element measurement table.

An element measurement table 1900 represents metrics measured for elements. For example, for the measurement ID associated with an element, the element measurement table 1900 includes a measurement time, a response time/SV, IOPS/SV, data transfer rate/SV, and the number of alert events/SV where "SV" is the abbreviation of the standardization value. In other words, the standardization value is calculated and registered by the management server program 541. The method of calculating the standardization value may be the one described referring to FIGS. 1 to 5. Since each standardization value changes with a change in threshold, the standardization value may be calculated from the measured value as needed, not stored in the table one after another.

FIG. 20 illustrates one example a screen history table.

A screen history table 2000 represents the history of transition of screens, and may be the queue of the history of transition of screens. For example, the screen history table 2000, for each user manipulation, includes a manipulation ID, a parent-visual display condition, a main-visual display condition, a child-visual display condition, a parent-visual bit map ID and a child-visual bit map ID. The top record represents the oldest manipulation, and every time a new manipulation is performed, a record is added to the end.

The details of the display condition ID "ViewX" (X being an integer) registered in each display condition column can be specified from a table in FIG. 21 with the "ViewX" as a key. "N/A" means that there is not display of a visual. "View0" means a predetermined visual (e.g., quadrate visual filled in gray). Further, a bit map of visuals is associated with an ID "bmpX" (X being an integer) registered in the bit map ID column. For example, a bit map image is created visual by visual.

In consideration of the tables in FIGS. 18 and 21, for example, the following is apparent from the table 2000 in FIG. 20.

(20-1) Display of the initial management screen. A record of "View1" is added.

(20-2) Move-to-lower-level-layer manipulation for the "North America/Marketing" box on the screen of "View1." As a result, a record of "View2" is added.

(20-3) Move-to-lower-level-layer manipulation for the "Archive02" box on the screen of "View2." As a result, a record of "View3" is added.

(20-4) Change in display time during the display of the screen of "View3" and update of the display originating therefrom. As a result, a record of "View4" is added.

(20-5) Move-to-lower-level-layer manipulation for the "Storage1" box on the screen of "View4." As a result, a record of "View5" is added.

(20-6) Move-to-higher-level-layer manipulation for the "Port1" box on the screen of "View5." A record of "View6" is added.

FIG. 21 illustrates one example of a display condition table.

A display condition table 2100 represents, for each main visual displayed, a display condition which is the basis of the main visual. For example, for each display condition ID, the display condition table 2100 includes a layer ID (ID of the layer of attention), a selected element ID (ID of the element (selected element) that is the cause for displaying the main visual), an initiation of the display period, an end of the display period, a threshold 1, a threshold 2, a default and a metric type. A record corresponding to the display condition of the current main visual is added to the table 2100 by the management server program 541. When old visuals are bit-mapped, the old display condition may not be included; however, there may be a case where the number of bit maps increases too much so that all the visuals may not be bit-mapped so that with display conditions being registered in the table 2100, the management server program 541 can recreate the bit map of visuals based on the registered display conditions. A record (record of the display condition ID "View0") corresponding to a predetermined visual (e.g., visual filled in gray) may be included in the display condition table 2100. In addition, a record of the display condition ID "View0" and a record of default=Y are records remaining undeleted even when the default display process is performed, and other records are records to be deleted when the default display process is performed.

FIG. 22 illustrates one example of a highlighting element table.

An highlighting element table 2200 shows a highlighting element (element to be subjected to highlighting manipulation) and an element related to that element. For example, the highlighting element table 2200 includes a highlighting element ID and a related element ID (ID of an element related to the highlighting element) for each highlighting element. When the highlighting element does not become a subject to highlighting (when setting of highlighting is cancelled), all the records including the ID of that highlighting element are deleted.

FIG. 23 illustrates one example of a marking table.

A marking table 2300 represents an element on which the marking manipulation is performed, and the marking time. For example, the marking table 2300 includes the element ID of an element to be subjected to the marking manipulation, the element type of the element and the marking time for each marking manipulation.

The user can delete a mark on one of graphs (mark displayed through the marking manipulation) from that graph. In this case, the management server program 541 can delete all the marks with the same marking time as the marking time corresponding to the deleted mark, and delete a record containing the marking time from the marking table 2300.

FIG. 24 illustrates one example of a layer definition table.

A layer definition table 2400 represents a level relation among layers, and element types belonging to layers. For example, the layer definition table 2400 includes a layer ID (e.g., name of a layer) and an element type belonging to a layer for each layer. The arrangement of records represents the level relation among layers. Information represented by the table 2400 may be embedded in the management server program 541 in place of the table 2400.

FIG. 25 illustrates one example of a default display metric type table.

A default display metric type table 2500 represents a display metric type to be used in the display in the main visual, when a go-to manipulation is performed on the selected element, after execution of the go-to manipulation. For example, the default display metric type table 2500 includes a premovement element type/metric type (a set of the premovement element type and display metric type) and a postmovement element type/metric type (a set of the postmovement element type and display metric type). The "premovement element type" is the type of an element of attention corresponding to the main visual before being changed by at least one of the go-to manipulation and the return manipulation. The "postmovement element type" is the type of an element of attention corresponding to the main visual after being changed by at least one of the go-to manipulation and the return manipulation (i.e., the type of the element selected for that manipulation). The management server program 541 changes the display of the main visual based on the table 2500.

For each of the main visual before the go-to manipulation and the main visual after the go-to manipulation, information corresponding to at least one of the following may be registered or updated in the default display metric type table 2500 by the management server program 541.

(25-1) For the premovement element type, a metric type corresponding to at least one of the following is registered.
(*) A display metric type displayed for a given time or longer.
(*) A display metric type which has been used when at least one of the go-to manipulation and the return manipulation is performed.

(25-2) For the postmovement element type, a metric type corresponding to at least one of the following is registered.
(*) A display metric type displayed for a given time or longer.
(*) A display metric type which has been used when at least one of the go-to manipulation and the return manipulation is performed.

The results of (25-1) and (25-2) are registered in the table 2500. A statistical process may be performed before storage so that a high-frequency combination is registered in the table 2500.

Figures 26, 27:
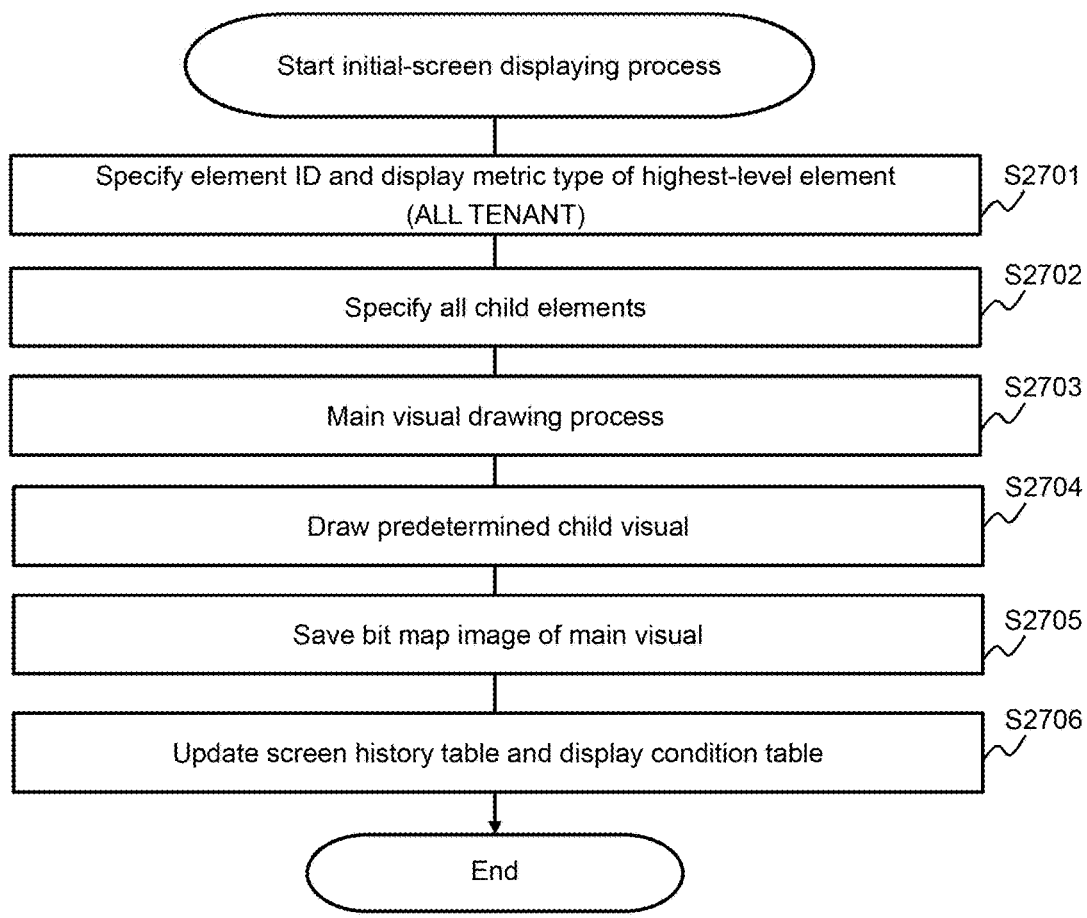
FIG. 26 illustrates one example of a threshold table.
FIG. 27 illustrates the flow of an initial-screen displaying process.

FIG. 26 illustrates one example of a threshold table.

A threshold table 2600 includes a threshold 1 and a threshold 2 for each combination of an element type and a metric type.

Changing the threshold can be achieved by one of (A) provision of a threshold changing tool (e.g., bar 441 as illustrated in FIG. 9) for each element type and manipulation of the threshold changing tool of a desired element type, and (B) provision of a single threshold changing tool common to a plurality of element types and manipulation of the single threshold changing tool. In the case (B), for each element type, the management server program converts thresholds (threshold 1 and threshold 2) set by using the threshold changing tool to thresholds corresponding to the element type. It is to be noted that there are a plurality of metric types that can be classified into a metric type (e.g., response time) which is not favorable when exceeding the threshold, and a metric type (e.g., data transfer rate) which is not favorable when falling below the threshold. According to this viewpoint, a first type of visual for the "metric type which is not favorable when exceeding the threshold" and a second type of visual for the "metric type which is not favorable when falling below the threshold" may be created as visuals. For the first type of visual, a metric type selectable as a display metric type is only the metric type which is not favorable when exceeding the threshold, and for the second type of visual, a metric type selectable as a display metric type is only the metric type which is not favorable when falling below the threshold. This can permit the direction of manipulation on the threshold to be unified visual type by visual type.

The above has presented some examples of the tables included in the management table group 542. Execution of the default display manipulation (e.g., designation of the default button of the head region 415) deletes almost all records (histories) from predetermined one or more tables in the aforementioned tables, causing the initial management screen to be displayed. Specifically, when receiving the default display manipulation, the management server program 541 deletes all records from the screen history table 2000, deletes all records that do not correspond to either the record with the display condition ID "View0" or the record with default=Y from the display condition table 2100, deletes all records from the marking table 2300, and deletes all of the main visual, child visuals and parent visuals which are being displayed. Then, the management server program 541 performs an initial-screen displaying process in FIG. 27.

The following describes some processes which are performed in the embodiment referring to the drawings as needed.

FIG. 27 illustrates the flow of the initial-screen displaying process. The initial-screen displaying process provides the display of, for example, the initial management screen illustrated in FIG. 9.

The management server program 541 specifies the element ID of a highest-level element (parent element ID "N/A") from the element table 1800, and specifies a display metric type (S2701). The display metric type is specified from, for example, the default display metric type table 2500. In S2701, a display condition other than the display metric type (e.g., default value) may be specified.

The management server program 541 specifies every child element of an element corresponding to the element ID specified in S2701 (S2702). The child element specified in S2702 is an element whose element ID specified in S2701 is the parent element ID.

The management server program 541 performs the main visual drawing process (FIG. 28) based on the results of S2701 and S2702 (S2703). Further, the management server program 541 draws a predetermined child visual (e.g., child visual filled in gray) (S2704). Furthermore, the management server program 541 saves the bit map image of the main visual drawn in S2703 in a predetermined storage area (S2705). While the visual is saved as an image of the bit map form according to the embodiment, it may be saved as an image of a form other than the bit map.

The management server program 541 updates the screen history table 2000 and the display condition table 2100 (S2706). Specifically, for example, the management server program 541 adds a record where information including the display condition ID of the main visual, the display condition ID of a child visual, and the bit map ID of the child visual is registered (e.g., record at the first row in FIG. 20) to the screen history table 2000. Further, for example, the management server program 541 adds a record containing the display condition ID of the main visual (e.g., record at the second row in FIG. 21) to the display condition table 2100.

Figure 28:
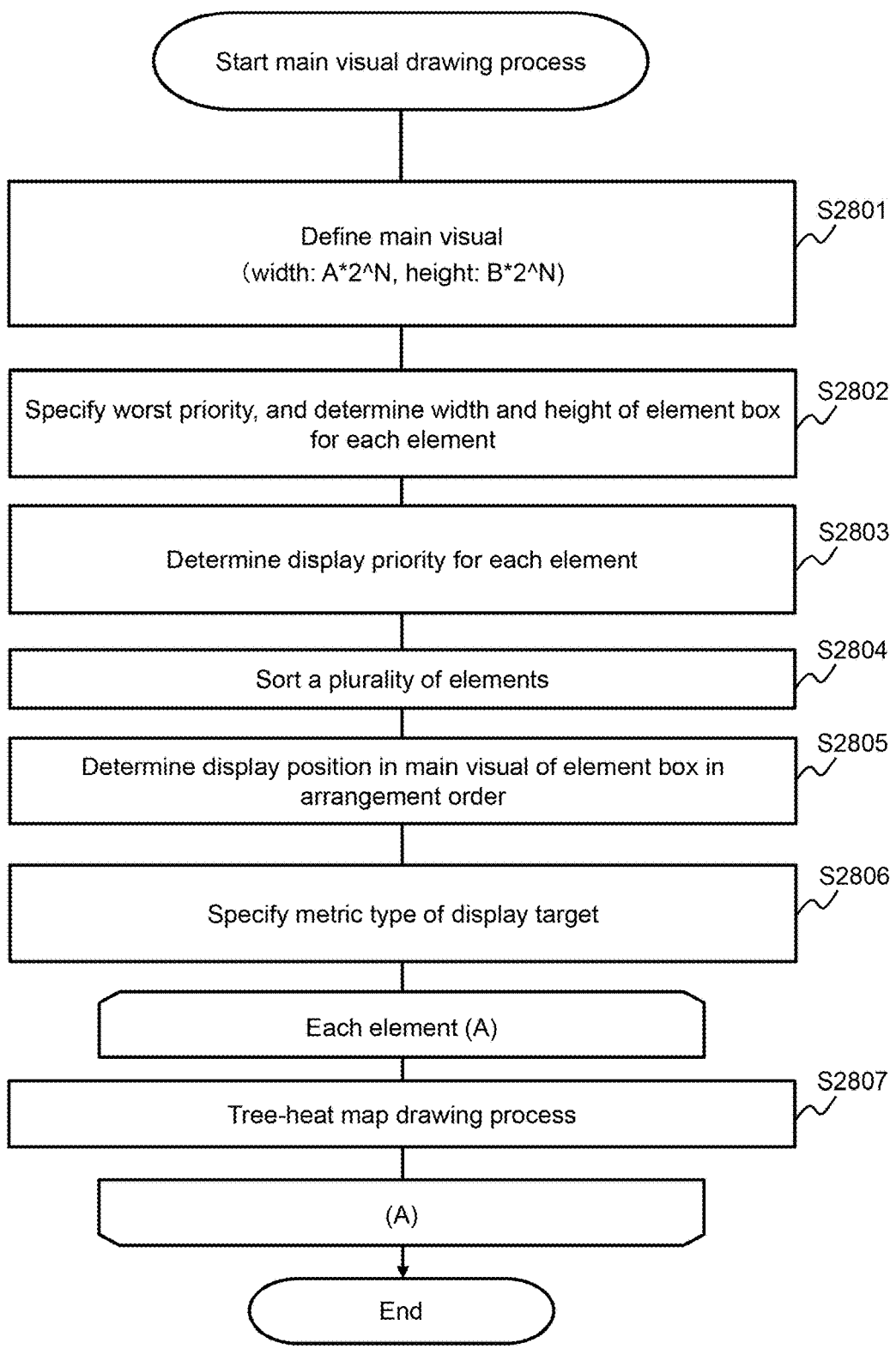
FIG. 28 illustrates the flow of a main visual drawing process.

FIG. 28 illustrates the flow of the main visual drawing process.

The management server program 541 defines the main visual (S2801). Specifically, a width $A \times 2^N$ and height $B \times 2^N$, for example, are set as the parameters for the main visual. A is the width of the element box for the worst standardization value of "1" and B is the height of the element box for the worst standardization value of "1." N is a natural number equal to or larger than the maximum value of the possible standardization values.

For each specified element, the management server program 541 specifies the worst priority and the width and height of the element box (S2802). The worst priority is specified from, for example, the element table 1800 (see FIG. 18). The width and height of the element box are determined based on, for example, the standardization value corresponding to the worst priority as already described. Specifically, the width of the element box is $A \times 2^n$, and the height of the element box is $B \times 2^n$ where n is (worst standardization value−1), A is the width for the worst standardization value of "1" and B is the height for the worst standardization value of "1." The width and height of the element box of each element may be determined metric type by metric type. The "each specified element" is each child element or each parent element of the element of attention. Specifically, for the display of the initial screen, for example, the "each specified element" is each child element of the root element (each element specified in S2702 in FIG. 27), and for the movement to lower-level-layer, the "each specified element" is each child element of the selected element (each element specified in S3002 in FIG. 30), and for the movement to higher-level-layer, the "each specified element" is each parent element of the selected element (each element specified in S3002 in FIG. 30).

The management server program 541 determines the display priority for each element mentioned in S2802 (S2803). The "display priority" is as described in "(5) Position of element box (position on the main visual region)."

The management server program 541 sorts the arrangement order of each element mentioned in S2802 according to the display priority determined in S2803 (S2804).

The management server program 541 determines the display position in the main visual of the element box in the arrangement order sorted in S2804 (S2805).

The management server program 541 specifies the metric type of a display target from the default display metric type table 2500 (see FIG. 25) (S2806).

The management server program 541 performs a tree-heat map drawing process for each element mentioned in S2802 (S2807).

Figure 29:
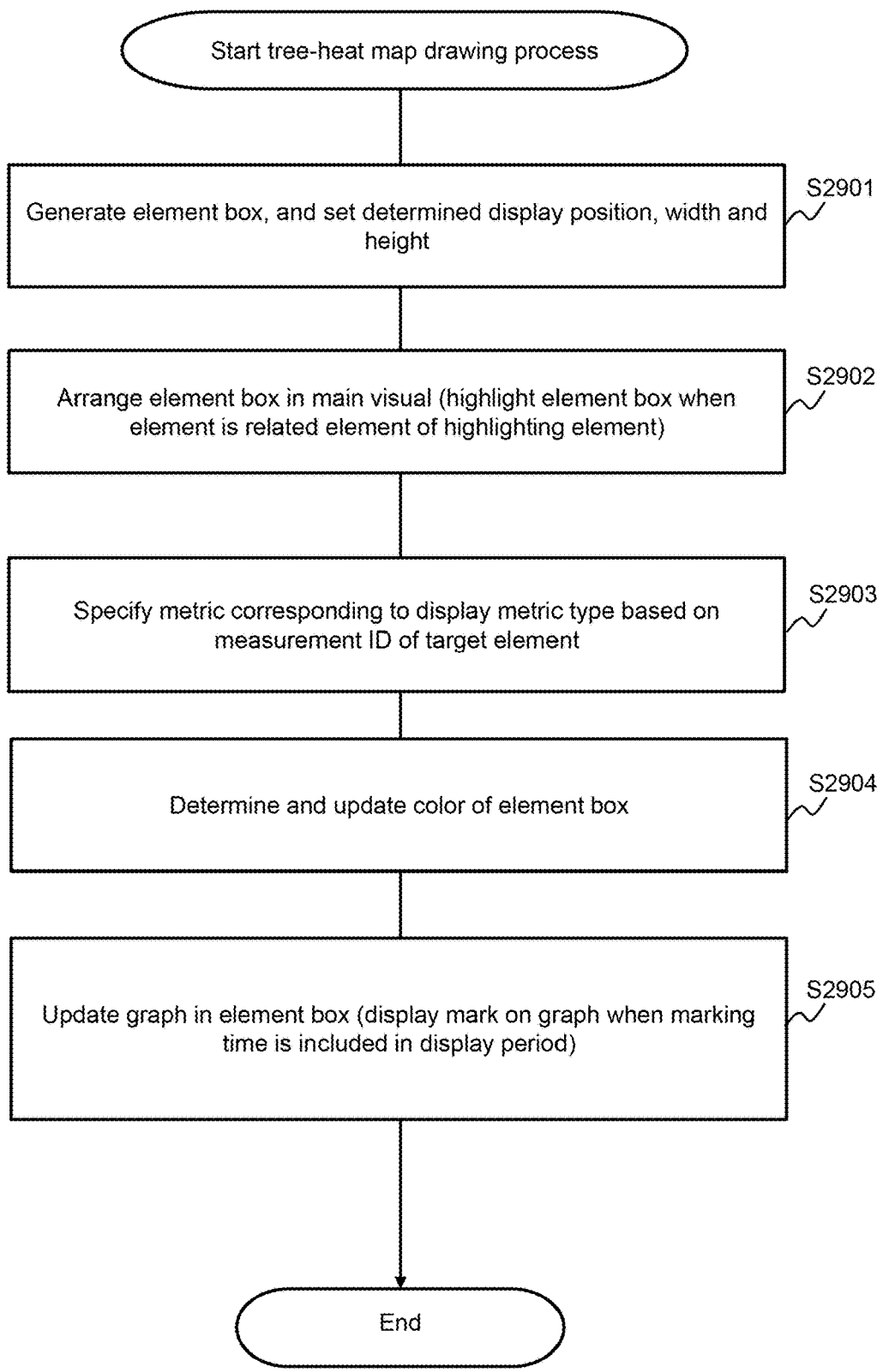
FIG. 29 illustrates the flow of a tree-heat map drawing process.

FIG. 29 illustrates the flow of the tree-heat map drawing process. This process is for a single element. In the following description of FIG. 29, the element is referred to as "target element" and the element box of the target element is referred to as "target box."

The management server program 541 generates the target box, and sets the display position, width and height which are determined for the target box in, for example, a memory (S2901). The display position may be coordinates based on the specified display priority, and means, for example, the coordinates of the upper left vertex of the target box (coordinates in the main visual region).

The management server program 541 arranges the target box at the display position in the main visual, which is set in S2901 (S2902). When it is specified from the highlighting element table 2200 that the target element is related to the highlighting element, the management server program 541 highlights the target box; specifically, the management server program 541 draws a highlighting object in the target box (places the highlighting object over the target box).

The management server program 541 specifies the measurement ID of the target element from the element table 1800 (see FIG. 18), and specifies the metric of the display metric type from the element measurement table 1900 (see FIG. 19) using the measurement ID (S2903). Then, the management server program 541 determines and updates the color of the target box based on the standardization value of the specified metric in S2903 (S2904). Further, the management server program 541 updates the graph in the target box based on the metric specified in S2903 (S2905). At this time, when it is specified from the marking table 2300 (FIG. 23) that the marking time is included in the display period, the management server program 541 display a mark on the graph. In case of switching the display metric type, S2903 to S2905 are executed for the display metric type after switching (i.e., the color of the element box and the graph are redrawn). The graph may not be displayed entirely, or display of some elements (e.g., elements with low worst priorities) may be omitted.

Figure 30:
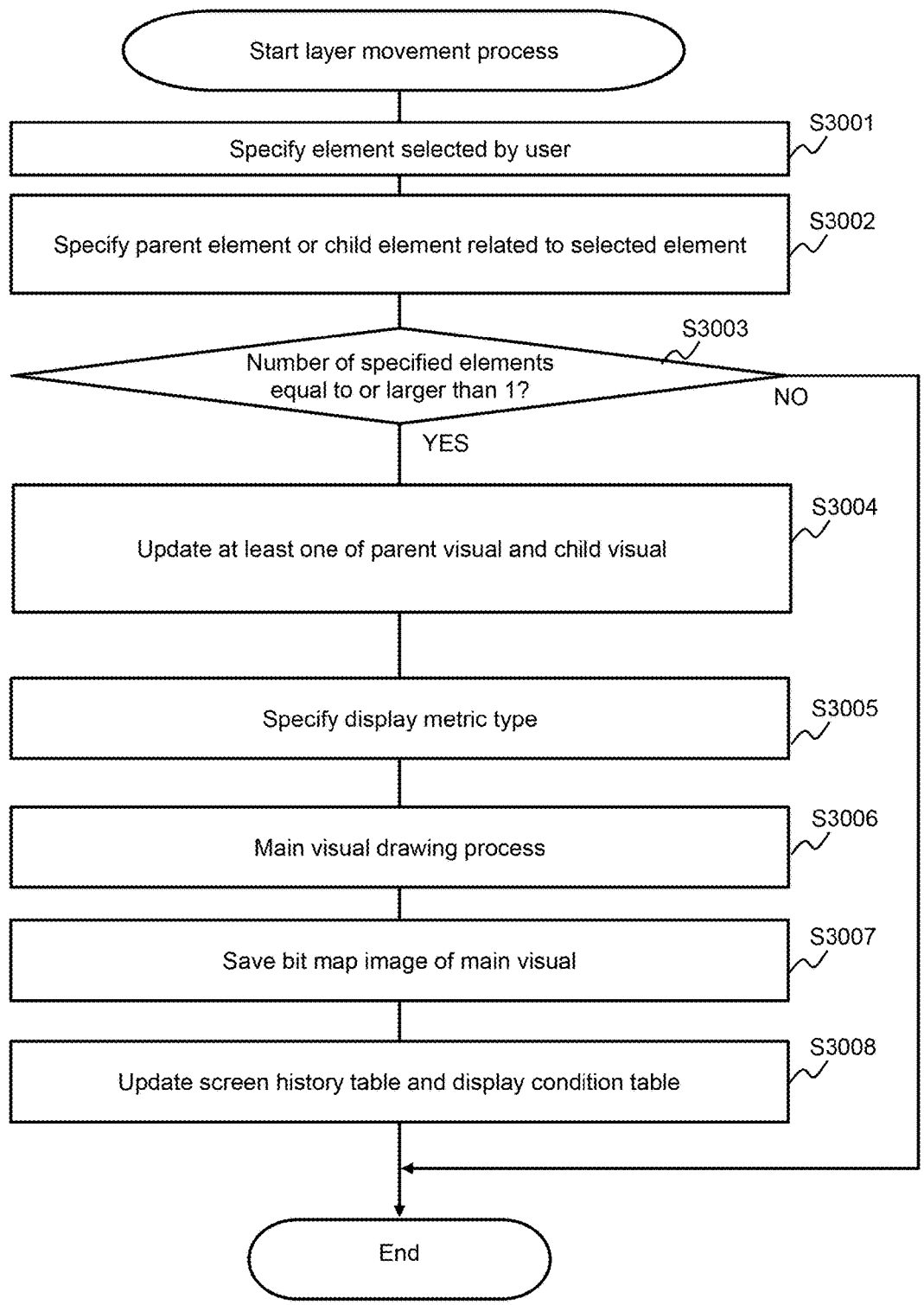
FIG. 30 illustrates the flow of a layer movement process.

FIG. 30 illustrates the flow of a layer movement process. The layer movement process permits achievement of both the transition from the management screen in FIG. 9 to the management screen in FIG. 10 (movement to lower-level-layer) and the transition from the management screen in FIG. 10 to the management screen in FIG. 11 (movement to higher-level-layer).

The management server program 541 specifies the element selected by the user (S3001). In the description of FIG. 30, the element specified in S3001 is referred to as "selected element." Then management server program 541 then specifies a parent element or a child element of the selected element (S3002). The element specified in S3002 is a parent element of the selected element for the movement to higher-level-layer, and is a child element of the selected element for the movement to lower-level-layer. The element specified in S3002 is referred to as "specified element" in the description of FIG. 30.

When there is even a single specified element (S3003: YES), the management server program 541 performs S3004 to S3008.

In other words, the management server program 541 updates at least one of a parent visual and a child visual (S3004).

The following provides specific examples, for example, when the layer movement is the movement to lower-level-layer.

(*) A higher-level visual is a visual containing boxes in the main visual immediately before the movement to lower-level-layer.

(*) When a child element exists with respect to an element represented by a box in the main visual immediately after the movement to lower-level-layer, the child element is the predetermined visual.

(*) When a child element does not exist with respect to an element represented by a box in the main visual immediately after the movement to lower-level-layer, there is no child element.

On the other hand, the following provides specific examples when the layer movement is the movement to higher-level-layer.

(*) A lower-level visual is a visual containing boxes in the main visual immediately before the movement to higher-level-layer.

(*) When a parent element exists with respect to an element represented by a box in the main visual immediately after the movement to higher-level-layer, the parent element is the predetermined visual.

(*) When a parent element does not exist with respect to an element represented by a box in the main visual immediately after the movement to higher-level-layer, there is no parent element.

The management server program 541 specifies a display metric type (S3005). For example, the display metric type may be specified from the default display metric type table 2500 based on the type of the element of attention before the layer movement and the display metric type, and the type of the element of attention (selected element) after the layer movement.

The management server program 541 performs the main visual drawing process (FIG. 28) (S3006). Further, the management server program 541 saves the bit map image of the main visual drawn in S3006 in a predetermined storage area (S3007). In addition, the management server program 541 updates the screen history table 2000 and the display condition table 2100 (S3008). Specifically, for example, the management server program 541 adds a record where information including the display condition ID of the main visual after the layer movement manipulation is registered to the screen history table 2000. Further, for example, the management server program 541 adds a record containing the display condition ID of the main visual to the display condition table 2100.

Figure 31:
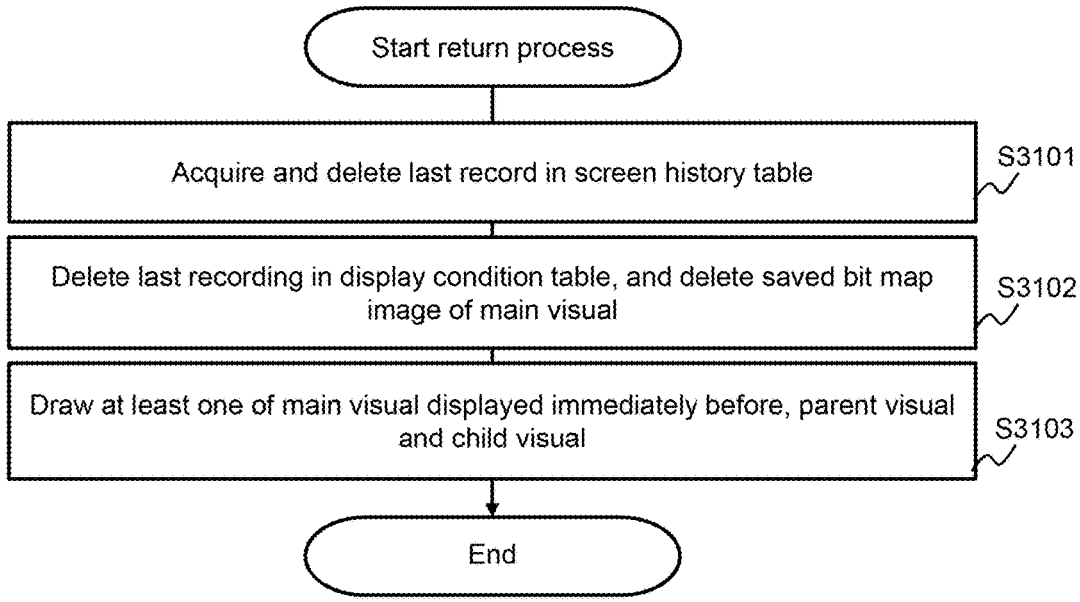
FIG. 31 illustrates the flow of a return process.

FIG. 31 illustrates the flow of the return process. This process returns the management screen from the management screen illustrated in FIG. 10 to the management screen illustrated in FIG. 9.

The management server program 541 acquires a last record from the screen history table 2000 and saves it in a work area or the like, and deletes the last record from the table 2000 (S3101).

The management server program 541 acquires a last record from the display condition table 2100 and saves it in the work area or the like, deletes the last record from the table 2100, and deletes the bit map image associated with each bit map ID contained in the record acquired in S3101 from a predetermined storage area (save area for the bit map image) (S3102).

The management server program 541 displays a management screen reflecting the main visual, the display condition and the like that are specified based on the last record in the screen history table 2000 after S3101 (management screen displayed before transition to the management screen that has been displayed before the return manipulation) (S3103).

Figure 32:
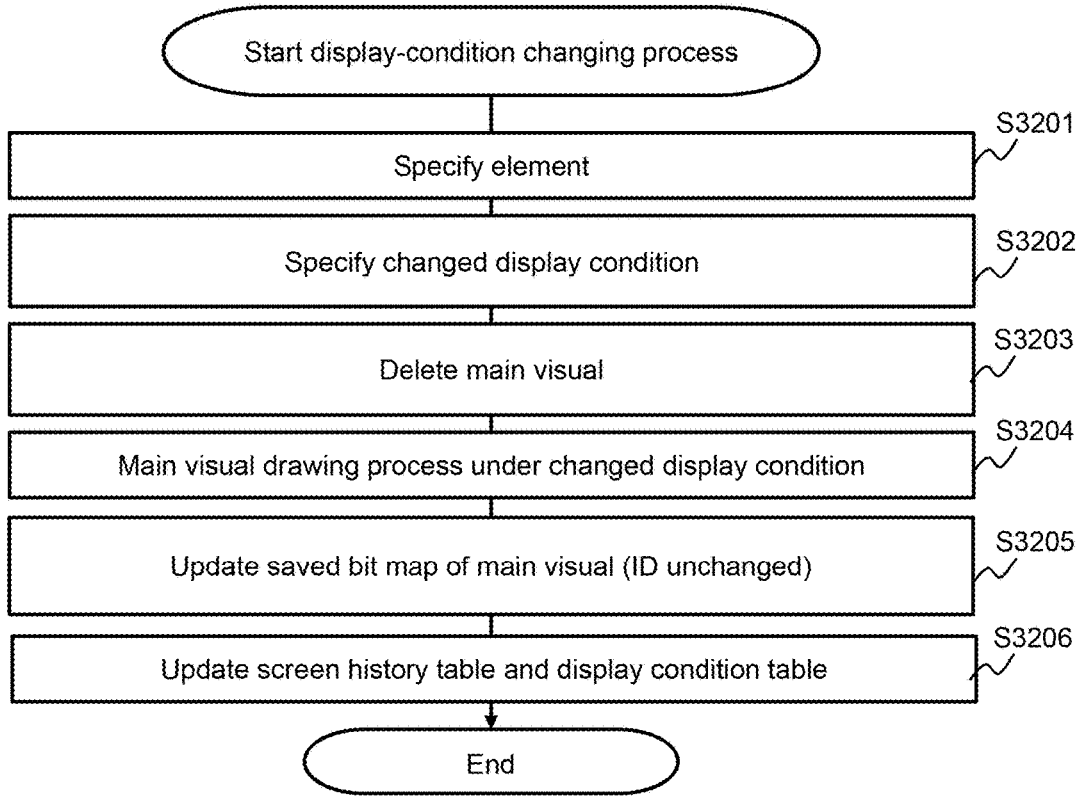
FIG. 32 illustrates the flow of a display-condition changing process.

FIG. 32 illustrates the flow of the display-condition changing process. This process causes the management screen to change, for example, from the management screen in FIG. 9 to the management screen in FIG. 12.

When receiving the display-condition changing process, the management server program 541 specifies an response time corresponding to the box displayed on the management screen (element corresponding to the display object drawn in the layout region as an object to be displayed on the management screen) (S3201).

The management server program 541 specifies the display condition after the change (S3202), deletes the current main visual from the management screen (S3203), and performs the main visual (FIG. 28) under the changed display condition (S3204). In the display-condition changing manipulation, at least one the display metric type, the display period and the threshold in the display condition is changed. Depending on the changed display condition, the worst priority may not change while the worst standardization value of an element changes, or the worst standardization value of an element and the worst priority may change.

The management server program 541 updates the bit map image of the main visual deleted in S3203 to the bit map image of the main visual drawn in S3204 (S3205). Therefore, the bit map ID associated with the updated bit map image remains the ID associated with the bit map image of the main visual deleted in S3203.

The management server program 541 updates the screen history table 2000 and the display condition table 2100 (S3206). For example, a record such as one containing the manipulation ID in FIG. 20 (record containing the user manipulation "change of display condition") is added to the screen history table 2000.

Figure 33:
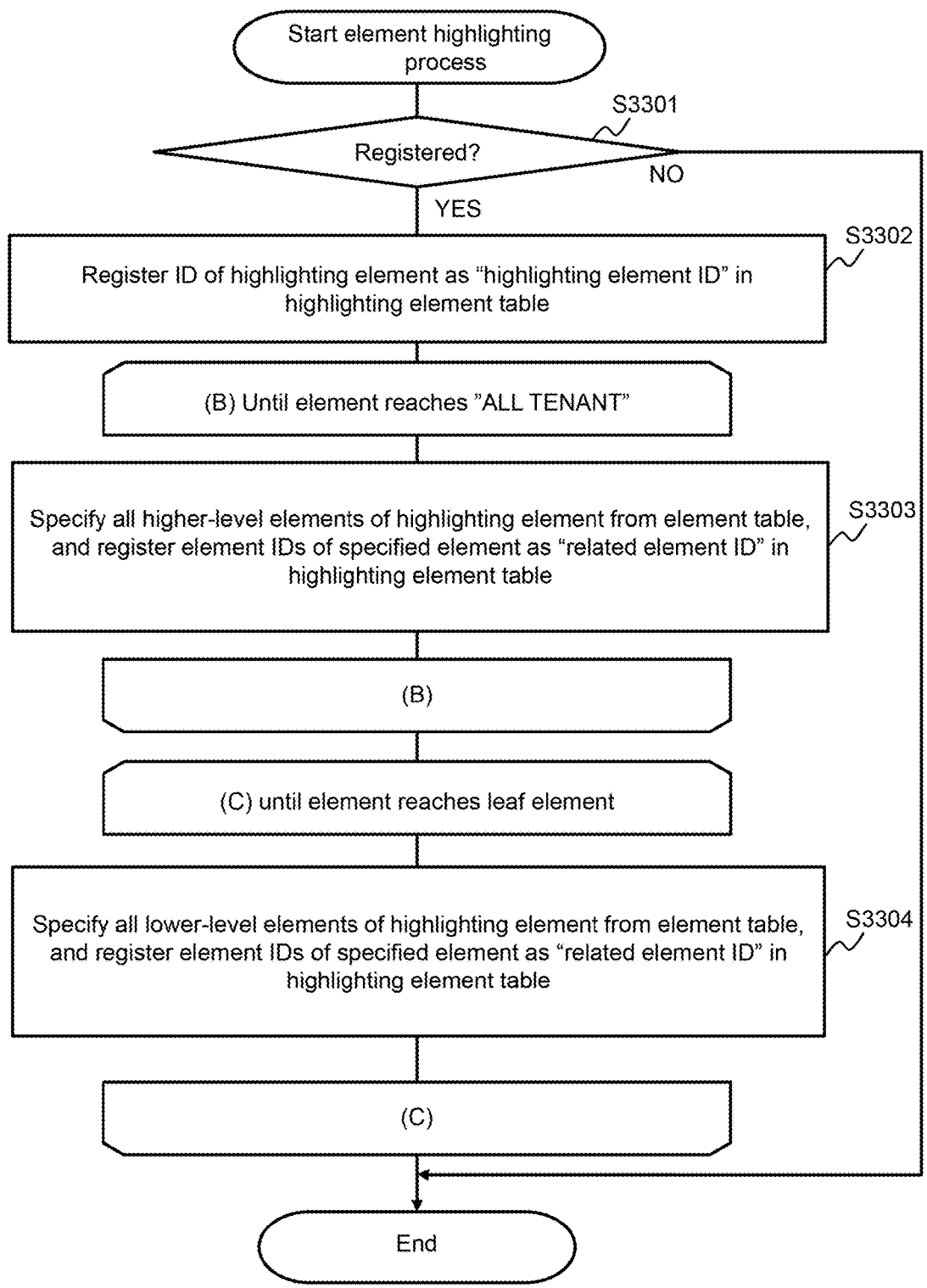
FIG. 33 illustrates the flow of an element highlighting process.

FIG. 33 illustrates the flow of the element enhancing process. This process achieves the display of, for example, the management screen in FIG. 14.

When a box is registered (copied) in the highlighting-element designating region 412 (S3301: YES), the management server program 541 registers the ID of an element (highlighting element) corresponding to the box as "highlighting element ID" in the highlighting element table 2200 (S3302).

The management server program 541 specifies all higher-level elements related to the highlighting element (except the root element) from the element table 1800, and associates the element ID of each of the specified higher-level elements as "related element ID" with the highlighting element ID registered in S3302 (registers the element ID of each of the specified higher-level elements in the highlighting element table 2200) (S3303).

The management server program 541 specifies all lower-level elements related to the highlighting element from the element table 1800, and associates the element ID of each of the specified lower-level elements as "related element ID" with the highlighting element ID registered in S3302 (registers the element ID of each of the specified lower-level elements in the highlighting element table 2200) (S3304).

While one embodiment has been described above as an illustrative description of the invention, the invention is not limited to this embodiment. The invention may be worked out in various other forms.

While one or more corresponding to one or more boxes contained in a main visual are elements matching a predetermined condition, such as child elements of the root element "ALL TENANT" or elements selected from one or more elements represented by an immediately previous main visual region, for example, "matching a predetermined condition" may include matching other kinds of conditions, such as elements matching a retrieve condition in place of or in addition to the conditions described in the foregoing description of the embodiment.

REFERENCE SIGNS LIST

100 Computer system
555 Management client
557 Management server

The invention claimed is:

1. A non-transitory computer readable storage medium that stores instructions that when executed by a processor cause the processor to:
   (A) assign priorities to each of one or more elements matching a predetermined condition based on management information including information representing a relation among elements and information representing a metric for each of the one or more elements;
   (B) cause a display to render visual representations that depict the priorities assigned to each of the one or more elements, wherein a display size of each of the visual representations on the display is determined based on a lowest priority of-the priorities assigned to each of the one or more elements in (A);
   (C) when receiving selection of one of the elements from the visual displayed in (B), selects a second layer representing a higher-level layer or a lower-level layer of a first layer representing a layer containing a selected element, and selecting one or more elements related to the selected element and contained in the second layer, based on a level relation among a plurality of layers and a correlation between element types and layers; and
   (D) performs (A) with the one or more elements selected in (C) treated as the one or more elements matching the predetermined condition.

2. The non-transitory computer readable storage medium according to claim 1,
   wherein, when a visual is displayed in (N+1)th (B) after displaying a visual in an Nth (B) (N=natural number), at least a part of a display range of the visual of (N+1)th (B) overlaps at least a part of a display range of a visual of Nth (B),
   wherein the visual contains an object representing a display object of each of at least one element represented by the visual, and
   wherein the object of an element selected in (C) after Nth (B) is enlarged by animation in such a way as to have a size which covers the display range of the visual of (N+1)th (B), and the visual of (N+1)th (B) is displayed as an enlarged element object.

3. The non-transitory computer readable storage medium according to claim 2,
   wherein, in (B), a visual is displayed in a visual region in a management screen having the visual region and a downward-view region,
   wherein a downward-view object is displayed in the downward-view region,
   wherein the downward-view object is a display object representing that selection of which element contained in which layer results in the display of the visual in the visual region, and
   wherein the downward-view object on the management screen where the visual of (N+1)th (B) is displayed represents a layer containing identification information of an element selected in (C) following the Nth (B) and the selected element.

4. The non-transitory computer readable storage medium according to claim 3,
   wherein, when a move-to-lower-level-layer manipulation is received for the selected element in (C), the second layer is a lower-level layer to the first layer,
   wherein the move-to-lower-level-layer manipulation is a user manipulation for displaying an element related to the selected element and contained in a lower-level layer of a layer containing the element,
   wherein the instructions further cause to the processor to:
   (E) when receiving a return manipulation for a visual of Mth (B) (where M is an integer equal to or larger than 2), return the visual on the visual region on the management screen to an (M−1)th visual from a visual of Mth (B), and
   wherein the return manipulation is a user manipulation for returning the visual on the visual region to a visual displayed one display before the display of the visual.

5. The non-transitory computer readable storage medium according to claim 4,
   wherein, when a move-to-higher-level-layer manipulation is received for the selected element in (C), the second layer is a higher-level layer to the first layer,
   wherein the move-to-higher-level-layer manipulation is a user manipulation for displaying an element related to the selected element and contained in a higher-level layer of a layer containing the element,
   wherein the instructions further cause to the processor to:
   (E) when receiving a display-metric-type changing manipulation, update a display of each of at least one element object contained in the visual on the management screen to display according to a priority based on a metric of an element corresponding to the element object, the metric corresponding to a changed display metric type according to the display-metric-type changing manipulation,
   wherein the display metric type is a metric type, among a plurality of metric types, of a metric based on which the priority is calculated, and wherein the display-metric-type changing manipulation is a user manipulation for changing the display metric type.

6. The non-transitory computer readable storage medium according to claim 1, wherein the instructions further cause to the processor to:
(F) when receiving selection of a highlighting element representing an element to be subjected to highlighting, specify a highlighting related element representing an element related to the highlighting element from the management information, wherein
wherein a visual includes an element object representing a display object of each of at least some elements in one or more elements represented by the visual, and
wherein, in (B), when a highlighting related element is included in the at least some elements in one or more elements represented by the visual, a highlighting object representing a display object representing identification information of the highlighting element is displayed in an element object of the highlighting related element in association therewith.

7. The non-transitory computer readable storage medium according to claim 1,
wherein a visual includes an element object representing a display object of each of at least some elements in one or more elements represented by the visual, and
wherein the instructions further cause to the processor to:
(G) when receiving a marking manipulation representing a user manipulation for designating a marking time representing a time to be marked for at least one element object represented by a visual, register the marking time, and
wherein, in (B), if the marking time is registered, a mark is displayed in a position in each graph in the at least one element object represented by the visual, the position corresponding to the marking time.

8. The non-transitory computer readable storage medium according to claim 1, wherein the instructions further cause to the processor to:
(H) when receiving a priority changing manipulation, change the priority according to the priority changing manipulation, and changing the visual of (B) to a visual according to the priority that is changed.

9. The non-transitory computer readable storage medium according to claim 1, wherein the instructions further cause to the processor to:
(I) when receiving a display-period changing manipulation, change a display period according to the display-period changing manipulation, and changing the visual of (B) to a visual according to the changed display period,
wherein the visual displayed in (B) executed after (I) is the visual according to the changed display period,
wherein the display period represents metric range, among time-series metrics, which become a basis of giving priority, and
wherein the metric range is metrics from a time which is a start point of the display period to a time which is an end point of the display period.

10. The non-transitory computer readable storage medium according to claim 1,
wherein, of the plurality of layers, two or more layers higher than a predetermined layer and including a layer containing an element related to an application are defined as an application hierarchy,
wherein, of the plurality of layers, two or more layers lower than the application hierarchy and including a layer containing an element related to a physical apparatus are defined as an infrastructure hierarchy,
wherein the instructions further cause to the processor to:
(J) when receiving selection of a mode, register the mode, wherein, the mode is either an application hierarchy mode or an infrastructure hierarchy mode,
wherein, when the mode is the application hierarchy mode, a visual which is displayed through the first (A) and (B) is a visual in which a visual priority is given to each of at least one element contained in a highest-level layer in the application hierarchy, and
wherein, when the mode is the infrastructure hierarchy mode, a visual which is displayed through the first (A) and (B) is a visual in which a visual priority is given to each of at least one element contained in a highest-level layer in the infrastructure hierarchy.

11. A management system that manages a plurality of elements that comprise a computer network, the management system comprising:
a display;
a communication interface that is communicatively coupled to each of the plurality of elements in the network;
a memory that stores management information including information representing a relation among elements, information representing a metric for each of the plurality of elements, and a manipulation history; and
a processor communicatively coupled to the display, the communication interface and the memory, wherein the processor:
(A) assign priorities to each of one or more elements from the plurality of elements that match a predetermined condition based on the management information stored in the memory,
(B) cause the display to render visual representations that depict the priorities assigned to each of the one or more elements, wherein a display size of each of the visual representations on the display is determined based on a lowest priority of the priorities assigned to each of the one or more elements in (A),
(C) when receiving selection of one of the elements from the visual displayed in (B), selects a second layer representing a higher-level layer or a lower-level layer of a first layer representing a layer containing a selected element, and selecting one or more elements related to the selected element and contained in the second layer, based on a level relation among a plurality of layers and a correlation between element types and layers, and
(D) performs (A) with the one or more elements selected in (C) treated as the one or more elements matching the predetermined condition.

12. The management system according to claim 11, wherein:
when a visual is displayed in (N+1)th (B) after displaying a visual in an Nth (B) (N=natural number), at least a part of a display range of the visual of (N+1)th (B) overlaps at least a part of a display range of a visual of Nth (B),
the visual contains an object representing a display object of each of at least one element represented by the visual, and
the object of an element selected in (C) after Nth (B) is enlarged by animation in such a way as to have a size which covers the display range of the visual of (N+1)th (B), and the visual of (N+1)th (B) is displayed as an enlarged element object.

13. The management system according to claim 12, wherein:
- in (B), a visual is displayed in a visual region in a management screen having the visual region and a downward-view region,
- a downward-view object is displayed in the downward-view region,
- the downward-view object is a display object representing that selection of which element contained in which layer results in the display of the visual in the visual region, and
- the downward-view object on the management screen where the visual of (N+1)th (B) is displayed represents a layer containing identification information of an element selected in (C) following the Nth (B) and the selected element.

14. The management system according to claim 13, wherein:
- when a move-to-lower-level-layer manipulation is received for the selected element in (C), the second layer is a lower-level layer to the first layer,
- the move-to-lower-level-layer manipulation is a user manipulation for displaying an element related to the selected element and contained in a lower-level layer of a layer containing the element,
- the processor further:
- (E) when receiving a return manipulation for a visual of Mth (B) (where M is an integer equal to or larger than 2), returns the visual on the visual region on the management screen to an (M−1)th visual from a visual of Mth (B), and
- wherein the return manipulation is a user manipulation for returning the visual on the visual region to a visual displayed one display before the display of the visual.

* * * * *